(12) United States Patent
Guillou et al.

(10) Patent No.: US 7,386,122 B1
(45) Date of Patent: Jun. 10, 2008

(54) METHOD FOR PROVING THE AUTHENTICITY OR INTEGRITY OF A MESSAGE BY MEANS OF A PUBLIC EXPONENT EQUAL TO THE POWER OF TWO

(75) Inventors: Louis Guillou, Bourgbarre (FR); Jean-Jacques Quisquater, Rhode Saint Genese (BE)

(73) Assignees: France Telecom, Paris (FR); TDF, Paris (FR); Math Rizk, Louvain-la-Neuve (BE)

( * ) Notice: Subject to any disclaimer, the term of this patent is extended or adjusted under 35 U.S.C. 154(b) by 0 days.

(21) Appl. No.: 09/889,918

(22) PCT Filed: Jan. 27, 2000

(86) PCT No.: PCT/FR00/00190

§ 371 (c)(1),
(2), (4) Date: Dec. 12, 2001

(87) PCT Pub. No.: WO00/45550

PCT Pub. Date: Aug. 3, 2000

(30) Foreign Application Priority Data

| Jan. 27, 1999 | (FR) | 99 01065 |
| Mar. 23, 1999 | (FR) | 99 03770 |
| Oct. 1, 1999 | (FR) | 99 12465 |
| Oct. 1, 1999 | (FR) | 99 12467 |
| Oct. 1, 1999 | (FR) | 99 12468 |

(51) Int. Cl.
*H04L 9/32* (2006.01)
*H04L 9/30* (2006.01)
*H04K 1/00* (2006.01)
*H04L 9/16* (2006.01)

(52) U.S. Cl. .................. 380/30; 713/170; 713/174; 713/176; 713/180

(58) Field of Classification Search .......... 713/170, 713/172, 174, 176, 180; 380/30
See application file for complete search history.

(56) References Cited

U.S. PATENT DOCUMENTS 5,046,094 A * 9/1991 Kawamura et al. .......... 380/46

(Continued)

FOREIGN PATENT DOCUMENTS

EP 311 470 4/1989

(Continued)

OTHER PUBLICATIONS

International Preliminary Examination Report for PCT/FR00/00190 dated Apr. 4, 2001.*

(Continued)

*Primary Examiner*—Ayaz Sheikh
*Assistant Examiner*—Matthew Henning
(74) *Attorney, Agent, or Firm*—Westman, Champlin & Kelly

(57) ABSTRACT

Proof is established by means of the following parameters: m pairs of private values $Q_1$ and public values $G_1$ m>1, a public module n made of the product of f first factors $p_j$, f>2, a public exponent v, linked to each other by relations of the type: $G_1 \cdot Q_i^v = 1$ mod n or $G_1 = Q_1^v$ mod n. Said exponent v is such that $v=2^k$ where k>1 is a security parameter. Public value $G_1$ is the square $g_1^2$ of a base number $g_i$ that is lower than f first factors $p_j$, so that the two equations: $x2=g_i$ mod n and $x^2=-g_1$ mod n do not have a solution in x in the ring of the modulo n integers and such that the equation $x^v=g_1^2$ mod n has solutions in x in the ring of the modulus n integers.

20 Claims, 5 Drawing Sheets

U.S. PATENT DOCUMENTS

| | | | | |
|---|---|---|---|---|
| 5,140,634 A | * | 8/1992 | Guillou et al. | 713/180 |
| 5,299,262 A | * | 3/1994 | Brickell et al. | 380/28 |
| 5,414,772 A | * | 5/1995 | Naccache et al. | 380/46 |
| 5,442,707 A | * | 8/1995 | Miyaji et al. | 380/30 |
| 6,615,352 B2 | * | 9/2003 | Terao et al. | 713/184 |
| 6,651,167 B1 | * | 11/2003 | Terao et al. | 713/168 |
| 6,795,553 B1 | * | 9/2004 | Kobayashi et al. | 380/28 |
| 7,093,134 B1 | * | 8/2006 | Gong | 713/180 |
| 7,246,098 B1 | * | 7/2007 | Walmsley | 705/64 |
| 7,280,663 B1 | * | 10/2007 | Golomb et al. | 380/277 |

FOREIGN PATENT DOCUMENTS

| | | |
|---|---|---|
| EP | 381 523 | 8/1990 |
| EP | 792 044 | 8/1997 |
| WO | 89/11706 | 11/1989 |
| WO | 96/33567 | 10/1996 |

OTHER PUBLICATIONS

Boyd, C. "Multisignatures Based on Zero Knowledge Schemes", Oct. 24, 1991, Electronics Letters vol. 27 Iss. 22, pp. 2002-2004.*

"Fast Decipherment Algorithm for RSA Public-Key Cryptosystem"; Quisquater, J.; Couvreur, C.; XP000577331; Oct. 14, 1992.

* cited by examiner

METHOD FOR PROVING THE AUTHENTICITY OR INTEGRITY OF A MESSAGE BY MEANS OF A PUBLIC EXPONENT EQUAL TO THE POWER OF TWO

CROSS-REFERENCE TO RELATED APPLICATIONS

This application is a 35 U.S.C. 371 of PCT application PCT/FR00/00190 filed Jan. 27, 2000.

FIELD OF THE INVENTION

The present invention relates to the methods, systems and devices designed to prove the authenticity of an entity and/or the integrity and/or authenticity of a message.

BACKGROUND OF THE INVENTION

The patent EP 0 311 470 B1, whose inventors are Louis Guillou and Jean-Jacques Quisquater, describes such a method. Hereinafter, reference shall be made to their work by the terms "GQ patent" or "GQ method". Hereinafter, the expression "GQ2", or "GQ2 invention" or "GQ2 technology" shall be used to describe the present invention.

According to the GQ method, an entity known as a "trusted authority" assigns an identity to each entity called a "witness" and computes its RSA signature. In a customizing process, the trusted authority gives the witness an identity and signature. Thereafter, the witness declares the following: "Here is my identity; I know its RSA signature". The witness proves that he knows the RSA signature of his identity without revealing this signature. Through the RSA public identification key distributed by the trusted authority, an entity known as a "controller" ascertains, without obtaining knowledge thereof, that the RSA signature corresponds to the declared identity. The mechanisms using the GQ method run "without transfer of knowledge". According to the GQ method, the witness does not know the RSA private key with which the trusted authority signs a large number of identifies.

The GQ technoloyg described here above makes use of RSA technology. However, while the RSA technology truly depends on the factorization of the modulus n, this dependence is not an equivalence, indeed far from it, as can be seen in what are called multiplicative attacks against various standards of digital signatures implementing the RSA technology.

The goal of the GQ2 technology is twofold: firstly to improve the performance characteristics of RSA technology and secondly to avert the problems inherent in RSA technology. Knowledge of the GQ2 private key is equivalent to knowledge of the factorization of the modulus n. Any attack on the triplets GQ2 leads to the factorization of the modulus n: this time there is equivalence. With the GQ2 technology, the work load is reduced for the signing or self-authenticating entity and for the controller entity. Through a better use of the problem of factorizing in terms of both security and performance, the GQ2 technology averts the drawbacks of RSA technology.

The GQ method implements modulo computations of numbers comprising 512 bits or more. These computations relate to numbers having substantially the same size raised to powers of the order of $2^{16}+1$. Now, existing microelectronic infrastructures, especially in the field of bank cards, make use of monolithic self-programmable microprocessors without arithmetical coprocessors. The work load related to multiple arithmetical applications involved in methods such as the GQ method leads to computation times which, in certain cases, prove to be disadvantageous for consumers using bank cards to pay for their purchases. It may be recalled here that, in seeking to increase the security of payment cards, the banking authorities have raised a problem that is particularly difficult to resolve. Indeed, two apparently contradictory questions have to be resolved: on the one hand, increasing security by using increasingly lengthy and distinct keys for each card while, on the other hand, preventing the work load from leading to excessive computation times for the user. This problem becomes especially acute inasmuch as it is also necessary to take account of the existing infrastructure and the existing microprocessor components.

The GQ2 technology provides a solution to this problem while boosting security.

BRIEF SUMMARY OF THE INVENTION

More particularly, the invention relates to a method designed to prove the following to a controller entity,
the authenticity of an entity and/or
the integrity of a message M associated with this entity,
This proof is established by means of all or part of the following parameters or derivatives of these parameters:
  m pairs of private values $Q_1, Q_2, \ldots Q_m$ and public values $G_1, G_2, \ldots G_m$ (m being greater than or equal to 1),
  a public modulus n constituted by the product of f prime factors $p_1, p_2, \ldots p_f$ (f being greater than or equal to 2),
  a public exponent v.
Said modulus, said exponent and said values are related by relations of the type $$G_i \cdot Q_i^v \equiv 1 \bmod n \text{ or } G_i \equiv Q_i^v \bmod n.$$

Said exponent v is such that $$v = 2^k$$

where k is a security parameter greater than 1.
Said public value $G_i$ is the square $g_i^2$ of a base number $g_i$ smaller than the f prime factors $p_1, p_2, \ldots p_f$. The base number $g_i$ is such that
  the two equations:

$$x^2 \equiv g_i \bmod n \text{ and } x^2 \equiv -g_i \bmod n$$

cannot be resolved in x in the ring of integers modulo n and such that:
  the equation:

$$x^v \equiv g_i^2 \bmod n$$

can be resolved in x in the ring of the integers modulo n.

Referring now to FIG. 1, an operation flow for a proces 100 is shown. The process 100 begins at operation 105 and proceeds to operation 110 in which private $Q_1 \, Q_2 \ldots Q_m$ and public value $G_1, G_2 \ldots G_m$ are obtained, where m is greater than or equal to 1. The process then proceeds to operation 115 in which the private values $Q_1, Q_2 \ldots Q_m$ are used in an authentication method or a signature method. The process ends at operation 120.

Said method implements an entity called a witness in the following steps. Said witness entity has f prime factors $p_i$ and/or parameters of the Chinese remainders of the prime factors and/or the public modulus n and/or the m private values $Q_i$ and/or the f.m components $Q_{i,j}$ ($Q_{i,j} \equiv Q_i \bmod p_j$) of the private values $Q_i$ and of the public exponent v.

The witness computes commitments R in the ring of integers modulo n. Each commitment is computed:

either by performing operations of the type:

$$R \equiv r^v \bmod n$$

where r is a random value such that $0 < r < n$, or by performing operations of the type:

$$R_i \equiv r_i^v \bmod p_i$$

where $r_i$ is a random value associated with the prime number $p_i$ such that $0 < r_i < p_i$, each $r_i$ belonging to a collection of random values $\{r_1, r_2, \ldots r_f\}$, then by applying the Chinese remainder method.

The witness receives one or more challenges d. Each challenge d comprises m integers $d_i$ hereinafter called elementary challenges. The witness, on the basis of each challenge d, computes a response D, either by performing operations of the type:

$$D \equiv r \cdot Q_1^{d1} \cdot Q_2^{d2} \cdot \ldots \cdot Q_m^{dm} \bmod n$$

or by performing operations of the type:

$$D_i \equiv r_i \cdot Q_{i,1}^{d1} \cdot Q_{i,2}^{d2} \cdot \ldots \cdot Q_{i,m}^{dm} \bmod p_i$$

and then by applying the Chinese remainder method.

The method is such that there are as many responses D as there are challenges d as there are commitments R, each group of numbers R, d, D forming a triplet referenced $\{R, d, D\}$.

DETAILED DESCRIPTION OF THE INVENTION

Case of the Proof of the Authenticity of an Entity

Figure 1:
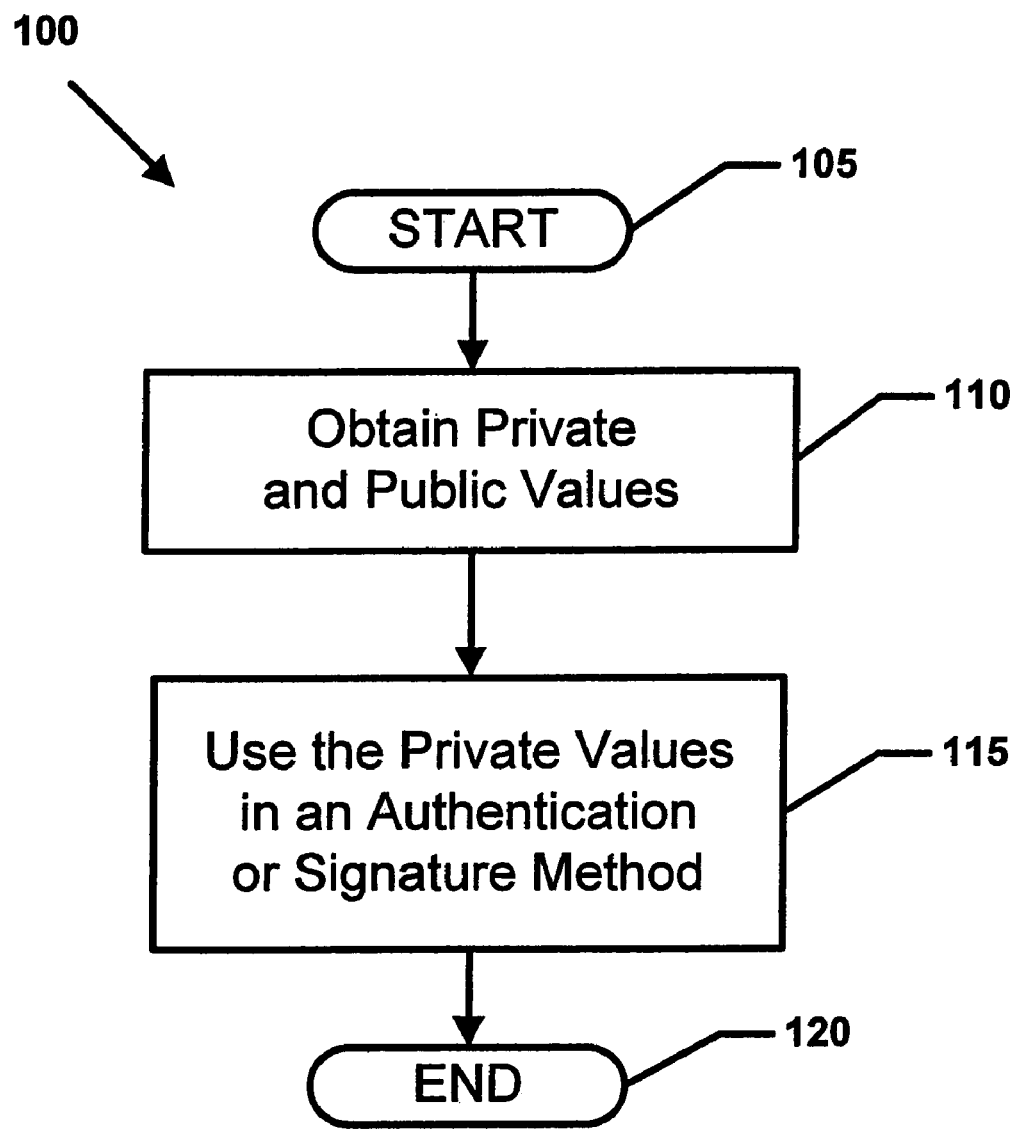
FIG. 1 is a flow chart representing the main steps of an authentication process or a signature process.
Figure 2:
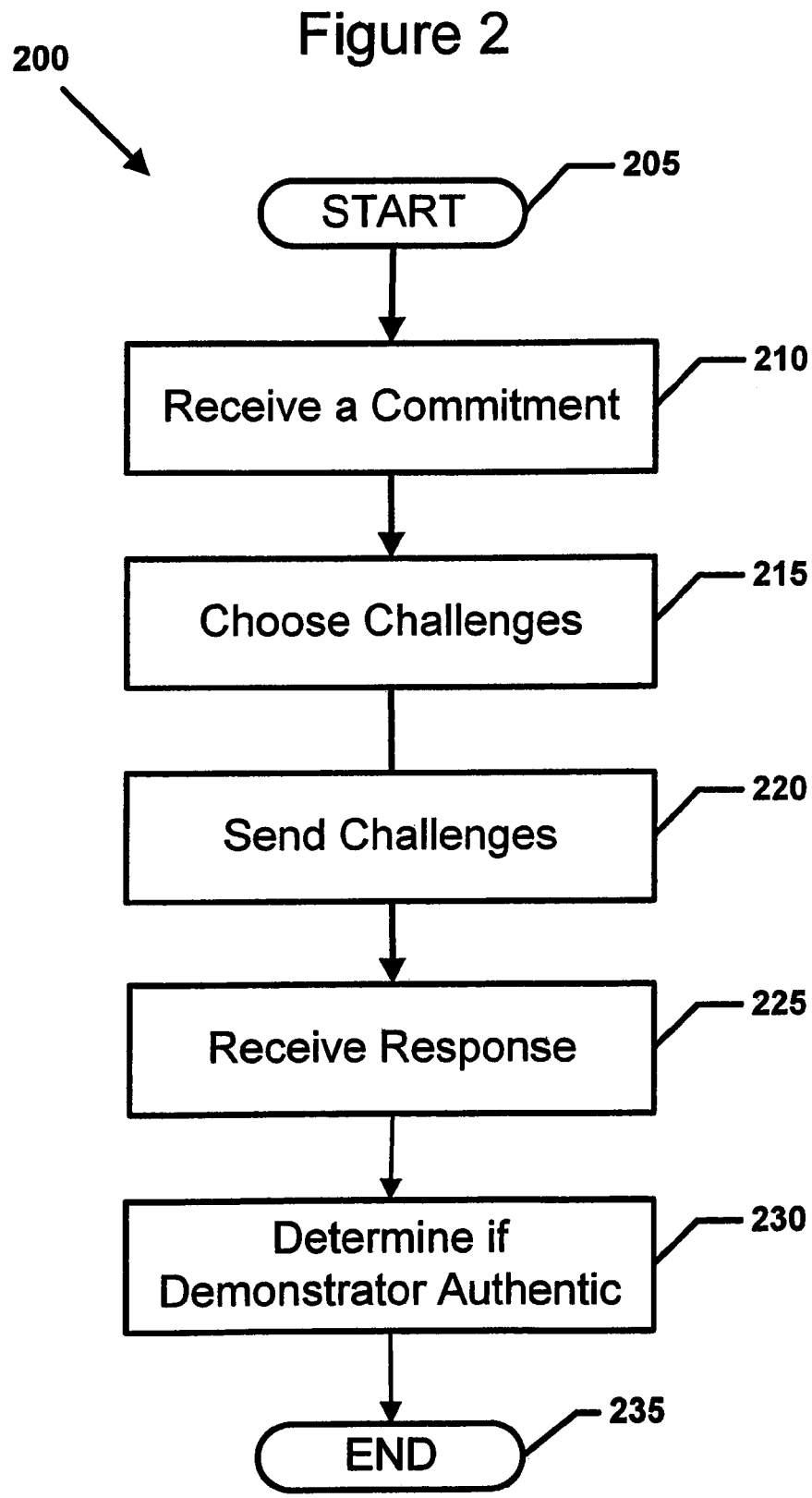
FIG. 2 is a flow chart representing the main steps of a process designed to prove the authenticity of a demonstrator.

In a first alternative embodiment, the method according to the invention is designed to prove the authenticity of an entity known as a demonstrator to an entity known as the controller Said demonstrator entity comprises the witness. Said demonstrator and controller entities execute the following steps as shown in the flow chart or process 200 in FIG. 2.

The process 200 begins at operation 205 and proceeds to operation 210 in which occurs:

Step 1: act of commitment R

At each call, the witness computes each commitment R by applying the process specified here above. The demonstrator sends the controller all or part of each commitment R.

The proces 200 then proceeds to operations 215 and 220 in which occurs:

Step 2: act of challenge d

The controller, after having received all or part of each commitment R, produces challenges d whose number is equal to the number of commitments R and sends the challenges d to the demonstrator.

The process 200 then proceeds to operation 225 in which occurs:

Step 3: act of response D

The witness computes the responses D from the challenges d by applying the above-specified process.

The process 200 then proceeds to operation 230 in which occurs:

Step 4: act of checking

The demonstrator sends each response D to the controller.

The process ends at operation 235.

First Case: The Demonstrator has Transmitted a Part of Each Commitment R

If the demonstrator has transmitted a part of each commitment R, the controller, having the m public values $G_1, G_2, \ldots, G_m$, computes a reconstructed commitment R', from each challenge d and each response D, this reconstructed commitment R' satisfying a relationship of the type $$R' \equiv G_1^{d1} \cdot G_2^{d2} \cdot \ldots \cdot G_m^{dm} \cdot D^v \bmod n$$

or a relationship of the type $$R' \equiv D^v / G_1^{d1} \cdot G_2^{d2} \cdot \ldots \cdot G_m^{dm} \bmod n$$

The controller ascertains that each reconstructed commitment R' reproduces all or part of each commitment R that has been transmitted to it.

Second case: the demonstrator has transmitted the totality of each commitment R

If the demonstrator has transmitted the totality of each commitment R, the controller, having the m public values $G_1, G_2, \ldots, G_m$, ascertains that each commitment R satisfies a relationship of the type $$R \equiv G_1^{d1} \cdot G_2^{d2} \cdot \ldots \cdot G_m^{dm} \cdot D^v \bmod n$$

or a relationship of the type $$R \equiv D^v / G_1^{d1} \cdot G_2^{d2} \cdot \ldots \cdot G_m^{dm} \bmod n$$

Case of the Proof of the Integrity of the Message

Figure 3:
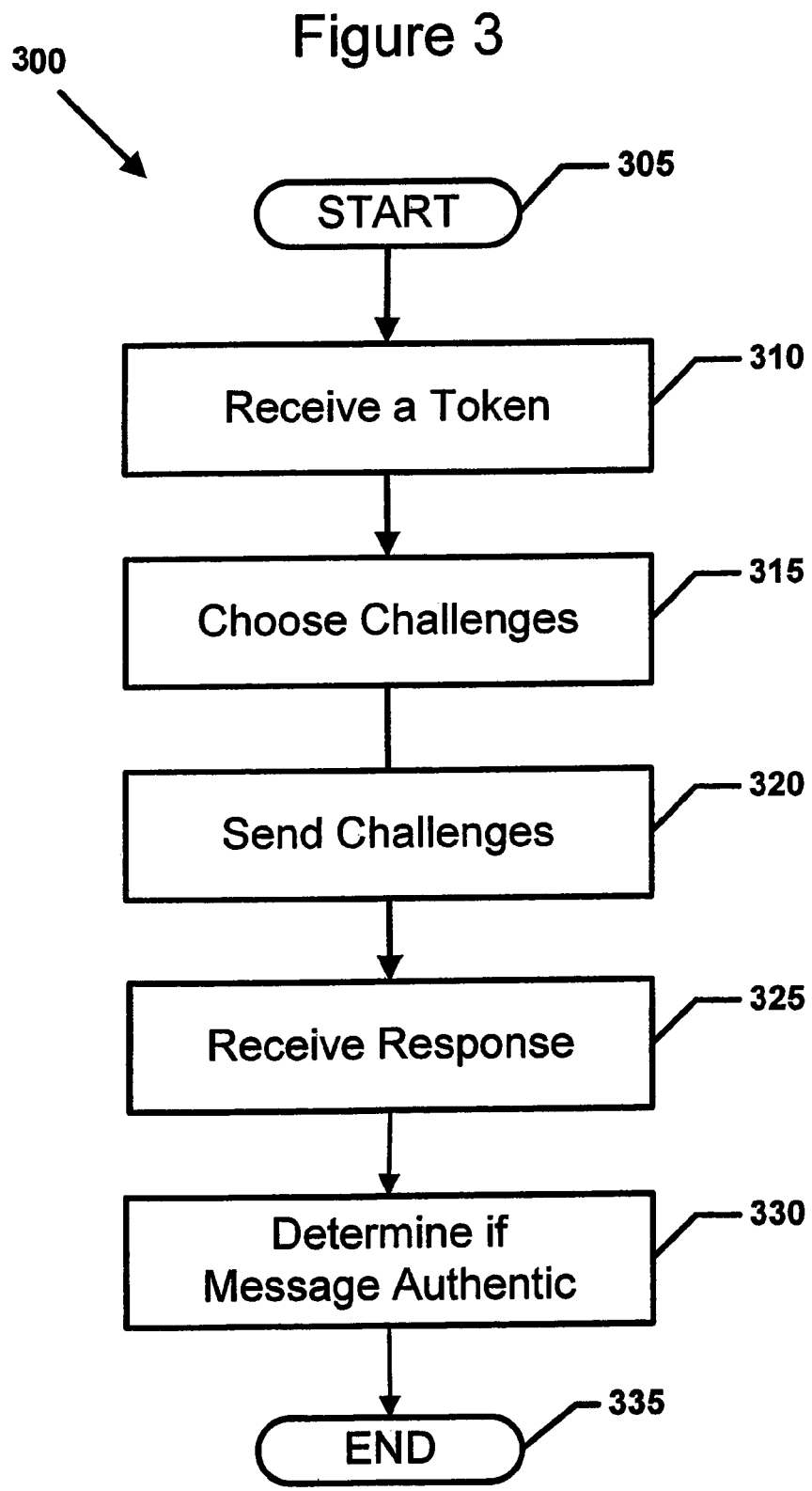
FIG. 3 is a flow chart representing the main steps of a process designed to prove the authenticity of a message.

In a second alternative embodiment capable of being combined with a first one, the method of the invention is designed to provide proof to an entity, known as the controller entity, of the integrity of a message M associated with an entity called a demonstrator entity. Said demonstrator entity comprises the witness. Said demonstrator and controller entities perform the following steps as shown in the flow chart of process 300 in FIG. 3.

The process 300 begins at operation 305 and proceeds to operation 310 in which occurs:

Step 1: act of commitment R

At each call, the witness computes each commitment R by applying the process specified here above.

The process 300 then proceeds to operations 315 and 320 in which occurs:

Step 2: act of challenge d

The demonstrator applies a hashing function h whose arguments are the message M and all or part of each commitment R to compute at least one token T. The demonstrator sends the token T to the controller. The controller, after having received a token T, produces challenges d equal in number to the number of commitments R and sends the challenges d to the demonstrator.

The process 300 then proceeds to operation 325 in which occurs:

Step 3: act of response D

The witness computes the response D from the challenges d by applying the above-specified process.

The process 300 then proceeds to operation 330 in which occurs:

Step 4: act of checking

The demonstrator sends each response D to the controller. The controller, having the m public values $G_1, G_2, \ldots, G_m$, computes a reconstructed commitment R', from each challenge d and each response D, this reconstructed commitment R' satisfying a relationship of the type $$R' \equiv G_1^{d1} \cdot G_2^{d2} \cdot G_m^{dm} \cdot D^v \bmod n$$

or a relationship of the type $$R' \equiv D^v/G_1^{d1} \cdot G_2^{d2} \ldots G_m^{dm} \cdot \bmod n$$

Then the controller applies the hashing function h whose arguments are the message M and all or part of each reconstructed commitment R' to reconstruct the token T'. Then the controller ascertains that the token T' is identical to the token T transmitted.

The process ends at operation 335.

Digital Signature of a Message and Proof of its Authenticity

In a third alternative embodiment capable of being combined with the above two, the method according to the invention 1 is designed to produce the digital signature of a message M by an entity known as the signing entity. Said signing entity includes the witness.

Signing Operation

Said signing entity executes a signing operation in order to obtain a signed message comprising:

the message M, the challenges d and/or the commitments R, the responses D.

Said signing entity executes the signing operation by implementing the following steps:

Step 1: act of commitment R

At each call, the witness computes each commitment R by applying the process specified here above.

Step 2: act of challenge d

The signing party applies a hashing function h whose arguments are the message M and each commitment R to obtain a binary train. From this binary train, the signing party extracts challenges d whose number is equal to the number of commitments R.

Step 3: act of response D

The witness computes the responses D from the challenges d by applying the above-specified process.

Checking Operation

To prove the authenticity of the message M, an entity called a controller checks the signed message. Said controller entity having the signed message carries out a checking operation by proceeding as follows.

Case where the controller has commitments R, challenges d, responses D

If the controller has commitments R, challenges d, responses D, the controller ascertains that the commitments R, the challenges d and the responses D satisfy relationships of the type $$R \equiv G_1^{d1} \cdot G_2^{d2} \ldots G_m^{dm} \cdot D^v \bmod n$$

or relationships of the type:

$$R \equiv D^v/G_1^{d1} \cdot G_2^{d2} \ldots G_m^{dm} \cdot \bmod n$$

Then the controller ascertains that the message M, the challenges d and the commitments R satisfy the hashing function:

$$d = h(\text{message}, R)$$

Case where the controller has challenges d and responses D

If the controller has challenges d and responses D, the controller reconstructs, on the basis of each challenge d and each response D, commitments R' satisfying relationships of the type $$R' \equiv G_1^{d1} \cdot G_2^{d2} \ldots G_m^{dm} \cdot D^v \bmod n$$

or relationships of the type:

$$R' \equiv D^v/G_1^{d1} \cdot G_2^{d2} \ldots G_m^{dm} \cdot \bmod n$$

Then the controller ascertains that the message M and the challenges d satisfy the hashing function:

$$d = h(\text{message}, R')$$

Case where the controller has commitments R and responses D

If the controller has commitments R and responses D, the controller applies the hashing function and reconstructs d'

$$d' = h(\text{message}, R)$$

Then the controller device ascertains that the commitments R, the challenges d' and the responses D satisfy relationships of the type $$R \equiv G_1^{d'1} \cdot G_2^{d'2} \ldots G_m^{d'm} \cdot D^v \bmod n$$

or relationships of the type:

$$R \equiv D^v/G_1^{d'1} \cdot G_2^{d'2} \ldots G_m^{d'm} \cdot \bmod n$$

System

The present invention also relates to a system designed to prove the following to a controller server:

the authenticity of an entity and/or the integrity of a message M associated with this entity, This proof is established by means of all or part of the following parameters or derivatives of these parameters:

m pairs of private values $Q_1, Q_2, \ldots Q_m$ and public values $G_1, G_2, \ldots G_m$ (m being greater than or equal to 1), a public modulus n constituted by the product of said f prime factors $p_1, p_2, \ldots p_f$ (f being greater than or equal to 2), a public exponent v.

Said modulus, said exponent and said values are linked by relations of the type $$G_i \cdot Q_i^v \equiv 1 \cdot \bmod n \text{ or } G_i \equiv Q_i^v \bmod n.$$

Said exponent v is such that $$v = 2^k$$

where k is a security parameter greater than 1.

Said public value $G_i$ is the square $g_i^2$ of the base number $g_i$ smaller than the f prime factors $p_1, p_2, \ldots p_f$. The base number $g_i$ is such that the two equations:

$$x^2 \equiv g_i \bmod n \text{ and } x^2 \equiv -g_i \bmod n$$

cannot be resolved in x in the ring of integers modulo n and such that the equation:

$$x^v \equiv g_i^2 \bmod n$$

can be resolved in x in the ring of the integers modulo n.

Said system comprises a witness device, contained especially in a nomad object which, for example, takes the form of a microprocessor-based bank card. The witness device comprises a memory zone containing the f prime factors $p_i$ and/or the parameters of the Chinese remainders of the prime factors and/or the public modulus n and/or the m private values $Q_i$ and/or f.m components $Q_{i,j}$ ($Q_{i,j} \equiv Q_i \bmod p_j$) of the private values $Q_i$ and of the public exponent v. The witness device also comprises:

random value production means, hereinafter called random value production means of the witness device, computation means, hereinafter called means for the computation of commitments R of the witness device.

The computation means compute commitments R in the ring of integers modulo n. Each commitment is computed:

either by performing operations of the type:

$$R \equiv r^v \bmod n$$

where r is a random value produced by the random value production means, r being such that $0 < r < n$, or by performing operations of the type:

$$R_i \equiv r_i^v \bmod p_i$$

where $r_i$ is a random value associated with the prime number $p_i$ such that $0 < r_i < p_i$, each $r_i$ belonging to a collection of random values $\{r_1, r_2, \ldots r_f\}$, then by applying the Chinese remainder method.

The witness device also comprises:

reception means hereinafter called the means for the reception of the challenges d of the witness device, to receive one or more challenges d; each challenge d comprising m integers $d_i$ hereinafter called elementary challenges.

computation means, hereinafter called means for the computation of the responses D of the witness device for the computation, on the basis of each challenge d, of a response D, either by performing operations of the type:

$$D \equiv r \cdot Q_1^{d_1} \cdot Q_2^{d_2} \cdot \ldots \cdot Q_m^{d_m} \bmod n$$

or by performing operations of the type:

$$D_i \equiv r_i \cdot Q_{i,1}^{d_1} \cdot Q_{i,2}^{d_2} \cdot \ldots \cdot Q_{i,m}^{d_m} \bmod p_i$$

and then by applying the Chinese remainder method.

The witness device also comprises transmission means to transmit one or more commitments R and one or more responses D. There are as many responses D as there are challenges d as there are commitments R, each group of numbers R, d, D forming a triplet referenced $\{R, d, D\}$.

Case of the Proof of the Authenticity of an Entity

In a first alternative embodiment, the system according to the invention is designed to prove the authenticity of an entity called a demonstrator to an entity called a controller.

Said system is such that it comprises a demonstrator device associated with a demonstrator entity. Said demonstrator device is interconnected with the witness device by interconnection means. It may especially take the form of logic microcircuits in a nomad object, for example the form of a microprocessor in a microprocessor-based bank card.

Said system also comprises a controller device associated with the controller eneity. Said controller device especially takes the form of a terminal or remote server. Said controller device comprises connection means for its electrical, electromagnetic, optical or acoustic connection, especially through a data-processing communications network, to the demonstrator device.

Said system is used to execute the following steps:

Step 1: act of commitment R

At each call, the means of computation of the commitments R of the witness device compute each commitment R by applying the process specified here above. The witness device has means of transmission, hereinafter called transmission means of the witness device, to transmit all or part of each commitment R to the demonstrator device through the interconnection means. The demonstrator device also has transmission means, hereinafter called the transmission means of the demonstrator, to transmit all or part of each commitment R to the controller device through the connection means.

Step 2: act of challenge d

The controller device comprises challenge production means for the production, after receiving all or part of each commitment R, of the challenges d equal in number to the number of commitments R. The controller device also has transmission means, hereinafter known as the transmission means of the controller, to transmit the challenges d to the demonstrator through the connection means.

Step 3: act of response D

The means of reception of the challenges d of the witness device receive each challenge d coming from the demonstrator device through the interconnection means. The means of computation of the responses D of the witness device compute the responses D from the challenges d by applying the process specified here above.

Step 4: act of checking

The transmission means of the demonstrator transmit each response D to the controller. The controller device also comprises:

computation means, hereinafter called the computations means of the controller device, comparison means, hereinafter called the comparison means of the controller device.

First Case: The Demonstrator has Transmitted a Part of Each Commitment R

If the transmission means of the demonstrator have transmitted a part of each commitment R, the computation means of the controller device, having m public values $G_1, G_2, \ldots, G_m$, compute a reconstructed commitment R', from each challenge d and each response D, this reconstructed commitment R' satisfying a relationship of the type $$R' \equiv G_1^{d_1} \cdot G_2^{d_2} \cdot \ldots \cdot G_m^{d_m} \cdot D^v \bmod n$$

or a relationship of the type $$R' \equiv D^v / G_1^{d_1} \cdot G_2^{d_2} \cdot \ldots \cdot G_m^{d_m} \bmod n$$

The comparison means of the controller device compare each reconstructed commitment R' with all or part of each commitment R received.

Second Case: The Demonstrator has Transmitted the Totality of Each Commitment R

If the transmission means of the demonstrator have transmitted the totality of each commitment R, the computation means and the comparison means of the controller device, having m public values $G_1, G_2, \ldots, G_m$, ascertain that each commitment R satisfies a relationship of the type $$R \equiv G_1^{d_1} \cdot G_2^{d_2} \cdot \ldots \cdot G_m^{d_m} \cdot D^v \bmod n$$

or a relationship of the type $$R \equiv D^v / G_1^{d_1} \cdot G_2^{d_2} \cdot \ldots \cdot G_m^{d_m} \bmod n$$

Case of the Proof of the Integrity of a Message

In a second alternative embodiment capable of being combined with the first one, the system according to the invention is designed to give proof to an entity, known as a controller, of the integrity of a message M associated with an entity known as a demonstrator. Said system is such that it comprises a demonstrator device associated with the demonstrator entity. Said demonstrator device is interconnected with the witness device by interconnection means. Said demonstrator device may especially take the form of logic microcircuits in a nomad object, for example the form of a microprocessor in a microprocessor-based bank card. Said system also comprises a controller device associated with the controller entity. Said controller device especially takes the form of a terminal or remote server. Said controller device comprises connection means for its electrical, electromagnetic, optical or acoustic connection, especially through a data-processing communications network, to the demonstrator device.

Said system is used to execute the following steps:

Step 1: act of commitment R

At each call, the means of computation of the commitments R of the witness device compute each commitment R by applying the process specified here above. The witness device has means of transmission, hereinafter called transmission means of the witness device, to transmit all or part of each commitment R to the demonstrator device through the interconnection means.

Step 2: act of challenge d

The demonstrator device comprises computation means, hereinafter called the computation means of the demonstrator, applying a hashing function h whose arguments are the message M and all or part of each commitment R to compute at least one token T. The demonstrator device also has transmission means, hereinafter known as the transmission means of the demonstrator device, to transmit each token T through the connection means to the controller device. The controller device also has challenge production means for the production, after having received the token T, of the challenges d in a number equal to the number of commitments R. The controller device also has transmission means, hereinafter called the transmission means of the controller, to transmit the challenges d to the demonstrator through the connection means.

Step 3: act of response D

The means of reception of the challenges d of the witness device receive each challenge d coming from the demonstrator device through the interconnection means. The means of computation of the responses D of the witness device compute the responses D from the challenges d by applying the process specified here above.

Step 4: act of checking

The transmission means of the demonstrator transmit each response D to the controller. The controller device also comprises computation means, hereinafter called the computation means of the controller device, having m public values $G_1, G_2, \ldots, G_m$, to firstly compute a reconstructed commitment R', from each challenge d and each response D, this reconstructed commitment R' satisfying a relationship of the type $$R' \equiv G_1^{d_1} \cdot G_2^{d_2} \cdot \ldots \cdot G_m^{d_m} \cdot D^v \bmod n$$

or a relationship of the type $$R' \equiv D^v / G_1^{d_1} \cdot G_2^{d_2} \cdot \ldots \cdot G_m^{d_m} \bmod n$$

then, secondly, compute a token T' by applying the hashing function h having as arguments the message M and all or part of each reconstructed commitment R'.

The controller device also has comparison means, hereinafter known as the comparison means of the controller device, to compare the computed token T' with the received token T.

Digital Signature of a Message and Proof of its Authenticity

In a third alternative embodiment capable of being combined with either or both of the first two embodiments, the system according to the invention is designed to prove the digital signature of a message M, hereinafter known as a signed message, by an entity called a signing entity. The signed message comprises:

the message M,
the challenges d and/or the commitments R,
the responses D.

Signing Operation

Said system is such that it comprises a signing device associated with the signing entity. Said signing device is interconnected with the witness device by interconnection means. It may especially take the form of logic microcircuits in a nomad object, for example the form of a microprocessor in a microprocessor-based bank card.

Said system is used to execute the following steps:

Step 1: act of commitment R

At each call, the means of computation of the commitments R of the witness device compute each commitment R by applying the process specified here above. The witness device has means of transmission, hereinafter called the transmission means of the witness device, to transmit all or part of each commitment R to the demonstrator device through the interconnection means.

Step 2: act of challenge d

The signing device comprises computation means, hereinafter called the computation means of the signing device, applying a hashing function h whose arguments are the message M and all or part of each commitment R to compute a binary train and extract, from this binary train, challenges d whose number is equal to the number of commitments R.

Step 3: act of response D

The means for the reception of the challenges d of the witness device receive each challenge d coming from the signing device through the interconnection means. The means for computing the responses D of the witness device compute the responses D from the challenges d by applying the process specified here above.

The witness device comprises transmission means, hereinafter called means of transmission of the witness device, to transmit the responses D to the signing device through the interconnection means.

Checking Operation

To prove the authenticity of the message M, an entity known as the controller checks the signed message.

The system comprises a controller device associated with the controller entity. Said controller device especially takes the form of a terminal or remote server. Said controller device comprises connection means for its electrical, electromagnetic, optical or acoustic connection, especially through a data-processing communications network, to the signing device.

The signing device associated with the signing entity comprises transmission means, hereinafter knonw as the transmission means of the signing device, for the transmission, to the controller device, of the signed message through the connection means. Thus the controller device has a signed message comprising:
   the message M,
   the challenges d and/or the commitments R,
   the responses D.
   The controller device comprises:
   computation means hereinafter called the computation means of the controller device,
   comparison means, hereinafter called the comparison means of the controller device.
   Case Where the Controller device has Commitments R, Challenges d, Responses D
   Should the controller device have commitments R, challenges d, responses D, the computation and comparison means of the controller device ascertain that the commitments R, the challenges d and the responses D satisfy relationships of the type $R \equiv G_1^{d1} \cdot G_2^{d2} \cdot \ldots G_m^{dm} \cdot D^v \mod n$ or relationships of the type $R \equiv D^v / G_1^{d1} \cdot G_2^{d2} \cdot \ldots G_m^{dm} \mod n$ Then, the computation and comparison means of the controller device ascertain that the message M, the challenges d and the commitments R satisfy the hashing function:

d=h (message, R)

Case Where the Controller Device has Challenges d and Responses D

If the controller has challenges d and responses D, the controller reconstructs, on the basis of each challenge d and each response D, commitments R' satisfying relationships of the type $R' \equiv G_1^{d1} \cdot G_2^{d2} \cdot \ldots G_m^{dm} \cdot D^v \mod n$ or relationships of the type:

$R' \equiv D^v / G_1^{d1} \cdot G_2^{d2} \cdot \ldots G_m^{dm} \mod n$

Then the controller ascertains that the message M and the challenges d satisfy the hashing function:

d=h (message, R')

Case Where the Controller has Commitments R and Responses D

If the controller has commitments R and responses D, the computation means of the controller device apply the hashing function and compute d' such that d'=h (message, R)

Then the computation and comparison means of the controller device ascertain that the commitments R, the challenges d' and the responses D satisfy relationships of the type $R \equiv G_1^{d1} \cdot G_2^{d2} \cdot \ldots G_m^{dm} \cdot D^v \mod n$ or relationships of the type:

$R \equiv D^v / G_1^{d1} \cdot G_2^{d2} \cdot \ldots G_m^{dm} \mod n$

Terminal Device

The invention also relates to a terminal device associated with an entity. The terminal device especially take the form of a nomad object, for example the form of a microprocessor in a microprocessor-based bank card. The terminal device is designed to prove the following to a controller server:
   the authenticity of an entity and/or
   the integrity of a message M associated with this entity.
   This proof is established by means of all or part of the following parameters or derivatives of these parameters:
   m pairs of private values $Q_1, Q_2, \ldots Q_m$ and public values $G_1, G_2, \ldots G_m$ (m being greater than or equal to 1),
   a public modulus n constituted by the product of said f prime factors $p_1, p_2, \ldots p_f$ (f being greater than or equal to 2),
   a public exponent v.
   Said modulus, said exponent and said values are related by relations of the type $G_i \cdot Q_i^v \equiv 1 \mod n$ or $G_i \equiv Q_i^v \mod n$.

Said exponent v is such that $v=2^k$ where k is a security parameter greater than 1.
   Said public value $G_i$ is the square $g_i^2$ of the base number $g_i$ smaller than the f prime factors $p_1, p_2, \ldots p_f$. The base number $g_i$ is such that:
   the two equations:

$x^2 \equiv g_i \mod n$ and $x^2 \equiv -g_i \mod n$ cannot be resolved in x in the ring of integers modulo n and such that
   the equation:

$x^v \equiv g_i^2 \mod n$ can be resolved in x in the ring of the integers modulo n.
   Said terminal device comprises a witness device comprising a memory zone containing the f prime factors $p_i$ and/or the parameters of the Chinese remainders of the prime factors and/or the public modulus n and/or the m private values $Q_i$ and/or f.m components $Q_{i,j}$ ($Q_{i,j} \equiv Q_i \mod p_j$) of the private values $Q_i$ and of the public exponent v.
   The witness device also comprises:
   random value production means, hereinafter called random value production means of the witness device,
   computation means, hereinafter called means for the computation of commitments R of the witness device, to compute commitments R in the ring of the integers modulo n.
   Each commitment is computed:
   either by performing operations of the type:

$R \equiv r^v \mod n$ where r is a random value produced by the random value production means, r being such that 0<r<n,
   or by performing operations of the type:

$R_i \equiv r_i^v \mod p_i$ where $r_i$ is a random value associated with the prime number $p_i$ such that $0<r_i<p_i$, each $r_i$ belonging to a collection of random values $\{r_1, r_2, \ldots r_f\}$ produced by the random value production means, then by applying the Chinese remainder method.
   The witness device also comprises:
   reception means hereinafter called the means for the reception of the challenges d of the witness device, to receive one or more challenges d; each challenge d comprising m integers $d_i$ hereinafter called elementary challenges.

computation means, hereinafter called means for the computation of the responses D of the witness device, for the computation, on the basis of each challenge d, of a response D,
either by performing operations of the type:

$$D \equiv r \cdot Q_1^{d1} \cdot Q_2^{d2} \cdot \ldots \cdot Q_m^{dm} \bmod n$$

or by performing operations of the type:

$$D_i \equiv r_i \cdot Q_{i,1}^{d1} \cdot Q_{i,2}^{d2} \cdot \ldots \cdot Q_{i,m}^{dm} \bmod p_i$$

and then by applying the Chinese remainder method.

Said witness device also comprises transmission means to transmit one or more commitments R and one or more responses D. There are as many responses D as there are challenges d as there are commitments R. Each group of numbers R, d, D forms a triplet referenced {R, d, D}.

Case of the Proof of the Authenticity of an Entity

In a first alternative embodiment, the terminal device according to the invention is designed to prove the authenticity of an entity called a demonstrator to an entity called a controller.

Said terminal device is such that it comprises a demonstrator device associated with a demonstrator entity. Said demonstrator device is interconnected with the witness device by interconnection means. It may especially take the form of logic microcircuits in a nomad object, for example the form of a microprocessor in a microprocessor-based bank card.

Said demonstrator device also comprises connection means for its electrical, electromagnetic, optical or acoustic connection, especially through a data-processing communications network, to the controller device associated with the controller entity. Said controller device especially takes the form of a terminal or remote server.

Said terminal device is sued to execute the following steps:

Step 1: act of commitment R

At each call, the means of computation of the commitments R of the witness device compute each commitment R by applying the process specified here above.

The witness device has means of transmission, hereinafter called transmission means of the witness device, to transmit all or part of each commitment R to the demonstrator device through the interconnection means. The demonstrator device also has transmission means, hereinafter called the transmission means of the demonstrator, to transmit all or part of each commitment R to the controller device, through the connection means.

Steps 2 and 3: act of challenge d, act of response D

The means of reception of the challenges d of the witness device receive each challenge d coming from the controller device through the connection means between the controller device and the demonstrator device and through the interconnection means between the demonstrator device and the witness device. The means of computation of the responses D of the witness device compute the responses D from the challenges d by applying the process specified here above.

Step 4: act of checking

The transmission means of the demonstrator transmit each response D to the controller that carries out the check.

Case of the Proof of the Integrity of a Message

In a second alternative embodiment capable of being combined with the first one, the terminal device according to the invention is designed to give proof to an entity, known as a controller, of the integrity of a message M associated with an entity known as a demonstrator. Said terminal device is such that it comprises a demonstrator device associated with the demonstrator entity. Said demonstrator device is interconnected with the witness device by interconnection means. It may especially take the form of logic microcircuits in a nomad object, for example the form of a microprocessor in a microprocessor-based bank card. Said demonstrator device comprises connection means for its electrical, electromagnetic, optical or acoustic connection, especially through a data-processing communications network, to the controller device associated with the controller entity. Said controller device especially takes the form of a terminal or remote server.

Said terminal device is used to execute the following steps:

Step 1: act of commitment R

At each call, the means of computation of the commitments R of the witness device compute each commitment R by applying the process specified here above. The witness device has means of transmission, hereinafter called the transmission means of the witness device, to transmit all or part of each commitment R to the demonstrator device through the interconnection means.

Steps 2 and 3: act of challenge d, act of response D

The demonstrator device comprises computation means, hereinafter called the computation means of the demonstrator, applying a hashing function h whose arguments are the message M and all or part of each commitment R to compute at least one token T. The demonstrator device also has transmission means, hereinafter known as the transmission means of the demonstrator device, to transmit each token T, through the connection means, to the controller device.

Said controller, after having received the token T, produces challenges d in a number equal to the number of commitments R The means of reception of the challenges d of the witness device receive each challenge d coming from the controller device through the connection means between the controller device and the demonstrator device and through the interconnection means between the demonstrator device and the witness device. The means of computation of the responses D of the witness device compute the responses D from the challenges d by applying the process specified here above.

Step 4: act of checking

The transmission means of the demonstrator send each response D to the controller device which performs the check.

Digital Signature of a Message and Proof of its Authenticity

In a third alternative embodiment capable of being combined with either or both of the first two embodiments, the terminal device according to the invention is designed to produce the digital signature of a message M, hereinafter known as a signed message, by an entity called a signing entity. The signed message comprises:

the message M, the challenges d and/or the commitments R, the responses D.

Said terminal device is such that it comprises a signing device associated with the signing entity. Said signing device is interconnected with the witness device by interconnection means. It may especially take the form of logic microcircuits in a nomad object, for example the form of a microprocessor in a microprocessor-based bank card. Said demonstrator device comprises connection means for its electrical, electromagnetic, optical or acoustic connection, especially through a data-processing communications network, to the controller device associated with the controller entity. Said controller device especially takes the form of a terminal or remote server.

Signing Operation

Said terminal device is used to execute the following steps:

Step 1: act of commitment R

At each call, the means of computation of the commitments R of the witness device compute each commitment R by applying the process specified here above. The witness device has means of transmission, hereinafter called the transmission means of the witness device, to transmit all or part of each commitment R to the signing device through the interconnection means.

Step 2: act of challenge d

The signing device comprises computation means, hereinafter called the computation means of the signing device, applying a hashing function h whose arguments are the message M and all or part of each commitment R to compute a binary train and extract, from this binary train, challenges d whose number is equal to the number of commitments R.

Step 3: act of response D

The means for the reception of the challenges d of the witness device receive each challenge d coming from the signing device through the interconnection means. The means for computing the responses D of the witness device compute the responses D from the challenges d by applying the process specified here above. The witness device comprises transmission means, hereinafter called means of transmission of the witness device, to transmit the responses D to the signing device, through the interconnection means.

Controller Device

The invention also relates to a controller device. The controller device may especially take the form of a terminal or remote server associated with a controller entity. The controller device is designed to check:

the authenticity of an entity and/or the integrity of a message M associated with this entity.

This proof is established by means of all or part of the following parameters or derivatives of these parameters:

m pairs of public values $G_1, G_2, \ldots G_m$ (m being greater than or equal to 1), a public modulus n constituted by the product of said f prime factors $p_1, p_2, \ldots p_f$ (f being greater than or equal to 2), unknown to the controller device and to the associated controller entity, a public exponent v.

Said modulus, said exponent and said values are related by relations of the type $$G_i \cdot Q_i^v \equiv 1 \bmod n \text{ or } G_i \equiv Q_i^v \bmod n$$

where $Q_i$ designates a private value, unknown to the controller device, associated with the public value $G_i$.

The exponent v is such that $$v = 2^k$$

where k is a security parameter greater than 1.

Said public value $G_i$ is the square $g_i^2$ of a base number $g_i$ smaller than the f prime factors $p_1, p_2, \ldots p_f$. The base number $g_i$ is such that the two equations:

$$x^2 \equiv g_i \bmod n \text{ and } x^2 \equiv -g_i \bmod n$$

cannot be resolved in x in the ring of integers modulo n and such that:

the equation:

$$x^v \equiv g_i^2 \bmod n$$

can be resolved in x in the ring of the integers modulo n.

Case of the Proof of the Authenticity of an Entity

In a first alternative embodiment, the controller device according to the invention is designed to prove the authenticity of an entity called a demonstrator and an entity called a controller.

Said controller device comprises connection means for its electrical, electromagnetic, optical or acoustic connection, especially through a data-processing communications network, to a demonstrator device associated withh the demonstrator entity.

Said controller device is used to execute the following steps:

Steps 1 and 2: act of commitment R, act of challenge d

Said controller device also has means for the reception of all or part of the commitments R coming from the demonstrator device through the connection means.

The controller device has challenge production means for the production, after receiving all or part of each commitment R, of the challenges d in a number equal to the number of commitments R, each challenge d comprising m integers $d_i$ hereinafter called elementary challenges.

The controller device also has transmission means, hereinafter called transmission means of the controller, to transmit the challenges d to the demonstrator through the connection means.

Steps 3 and 4: act of response D, act of checking

The controller device also comprises:

means for the reception of the responses D coming from the demonstrator device, through the connection means, computation means, hereinafter called the computation means of the controller device, comparison means, hereinafter called the comparison means of the controller device.

First Case: The Demonstrator has Transmitted a Part of Each Commitment R

If the reception means of the demonstrator have received a part of each commitment R, the computation means of the controller device, having m public values $G_1, G_2, \ldots, G_m$, cmpute a reconstructed commitment R', from each challenge d and each response D, this reconstructed commitment R' satisfying a relationship of the type $$R' \equiv G_1^{d1} \cdot G_2^{d2} \cdot \ldots \cdot G_m^{dm} \cdot D^v \bmod n$$

or a relationship of the type $$R' \equiv D^v / G_1^{d1} \cdot G_2^{d2} \cdot \ldots \cdot G_m^{dm} \bmod n$$

The comparison means of the controller device compare each reconstructed commitment R' with all or part of each commitment R received.

Second Case: The Demonstrator has Transmitted the Totality of Each Commitment R

If the transmission means of the demonstrator have transmitted the totality of each commitment R, the computation means and the comparison means of the controller device, having m public values $G_1, G_2, \ldots, G_m$, ascertain that each commitment R satisfies a relationship of the type $$R \equiv G_1^{d1} \cdot G_2^{d2} \cdot \ldots \cdot G_m^{dm} \cdot D^v \bmod n$$

or a relationship of the type $$R \equiv D^v / G_1^{d1} \cdot G_2^{d2} \cdot \ldots \cdot G_m^{dm} \bmod n$$

Case of the Proof of the Integrity of a Message

In a second alternative embodiment capable of being combined with the first one, the controller device according to the invention is designed to give proof to an entity, known as a controller, of the integrity of a message M associated with an entity known as a demonstrator.

Said controller device comprises connection means for its electrical, electromagnetic, optical or acoustic connection, especially through a data-processing communications network, to a demonstrator device associated with the demonstrator entity.

Said system is used to execute the following steps:

Steps 1 and 2: act of commitment R, act of challenge d

Said controller device also has means for the reception of tokens T coming from the demonstrator device through the connection means. The controller device has challenge production means for the production, after having received the token T, of the challenges d in a number equal to the number of commitments R, each challenge d comprising m integers $d_i$, herein after called elementary challenges. The controller device also has transmission means, hereinafter called the transmission means of the controller, to transmit the challenges d to the demonstrator through the connection means.

Steps 3 and 4: act of response D, act of checking

The controller device also comprises means for the reception of the responses D coming from the demonstrator device, through the connection means. Said controller device also comprises computation means, hereinafter called the computation means of the controller device, having m public values $G_1, G_2, \ldots, G_m$, to firstly compute a reconstructed commitment R', from each challenge d and each response D, this reconstructed commitment R' satisfying a relationship of the type $$R' \equiv G_1^{d1}. G_2^{d2} \ldots G_m^{dm}. D^v \bmod n$$

or a relationship of the type $$R' \equiv D^v/G_1^{d1}. G_2^{d2} \ldots G_m^{dm}. \bmod n$$

then, secondly, compute a token T' by applying the hashing function h having as arguments the message M and all or part of each reconstructed commitment R'.

The controller device also has comparison means, hereinafter called the comparison means of the controller deivce, to compare the computed token T' with the received token T.

Digital Signature of a Message and Proof of its Authenticity

In a third alternative embodiment capable of being combined with either or both of the first two embodiments, the controller device according to the invention is designed to prove the authenticity of the message M by checking a signed message by means of an entity called a controller.

The signed message, sent by a signing device associated with a signing entity having a hashing function h (message, R) comprises:

the message M,
the challenges d and/or the commitment R,
the responses D.

Checking Operation

Said controller device comprises connection means for its electrical, electromagnetic, optical or acoustic connection, especially through a data-processing communications network, to a signing device associated with the signing entity. Said controller device recieves the signed message from the signed device, through the connection means.

The controller device comprises:
computation means, hereinafter called the computation means of the controller deivce,
comparison means, hereinafter called the comparison means of the controller device.

Case Where the Controller Device has Commitments R, Challenges d, Responses D

If the controller has commitments R, challenges d, responses D, the computation and comparison means of the controller device ascertain that the commitments R, the challenges d and the responses D satisfy relationships of the type $$R \equiv G_1^{d1}. G_2^{d2} \ldots G_m^{dm}. D^v \bmod n$$

or relationships of the type:

$$R \equiv D^v/G_1^{d1}. G_2^{d2} \ldots G_m^{dm}. \bmod n$$

Then the computation and comparison means of the controller device ascertain that the message M, the challenges d and the commitments R satisfy the hashing function:

$$d' = h \text{ (message, R)}$$

Case Where the Controller Device has Challenges d and Responses D

If the controller device has challenges d and responses D, the computation means of the controller, on the basis of each challenge d and each response D, compute commitments R' satisfying relationships of the type $$R' \equiv G_1^{d1}. G_2^{d2}. G_m^{dm}. D^v \bmod n$$

or relationships of the type:

$$R' \equiv D^v/G_1^{d1}. G_2^{d2} \ldots G_m^{dm}. \bmod n$$

Then the computation and comparison means of the controller device ascertain that the message M and the challenges d satisfy the hashing function:

$$d = h \text{ (message, R')}$$

Case Where the Controller Device has Commitments R and Responses D

If the controller device has commitments R and responses D, the computation means of the controller device apply the hasing function and compute d' such that $$d = h \text{ (message, R)}$$

Then the computation and comparison means of the controller device ascertain that the commitments R, the challenges d' and the responses D satisfy relationships of the type $$R \equiv G_1^{d'1}. G_2^{d'2} \ldots G_m^{d'm}. D^v \bmod n$$

or relationships of the type:

$$R \equiv D^v/G_1^{d'1}. G_2^{d'2} \ldots G_m^{d'm}. \bmod n$$

Description

The goal of GQ technology may be recalled: it is the dynamic authentication of entities and associated messages as well as the digital signature of messages.

The standard version of GQ technology makes use of RSA technology. However, although the RSA technology truly depends on factorizing, this dependence is not an equivalence, far from it, as can be shown from attacks, known as multiplicative attacks, against various digital signature standards implementing RSA technology.

In the context of GQ2 technology, the present part of the invention relates more specifically to the use of sets of GQ2 keys in the context of dynamic authentication and digital signature. The GQ2 technology does not use RSA technology. The goal is a towfold one: first to improve performance with respect to RSA technology and secondly to prevent problems inherent in RSA technology. The GQ2 private key is the factorization of the modulus n. Any attack on the GQ2 triplets amounts to the factorizing of the modulus n: this time there is equivalence. With the GQ2 technology, the work load is reduced both for the entity that signs or is authenticated and for the one that checks. Through an improved use of the problem of factorization, in terms of both security and performance, the GQ2 technology rivals the RSA technology.

The GQ2 technology uses one or more small integers greater than 1, for example m shall integers (m≧1) called base numbers and referenced $g_i$. Since the base numbers are fixed from $g_i$ to $g_m$ with m>1, a public verification key (v, n) is chosen as follows. The public verification exponent v is $2^k$ where k is a small integer greater than 1 (k≧2). The public modulus n is the product of at least two prime factors greater than the base numbers, for example f prime factors (f≧2) referenced by $p_j$, from $p_1 \ldots p_f$. The f prime factors are chosen so that the public modulus n has the following properties with respect to each of the m base numbers from $g_1$ to $g_m$.

Firstly, the equations (1) and (2) cannot be resolved in x in the ring of the integers modulo n, that is to say that $g_i$ and $-g_i$ are two non-quadratic residues (mod n).

$$x^2 \equiv g_i \pmod{n} \quad (1)$$

$$x^2 \equiv -g_i \pmod{n} \quad (2)$$

Secondly, the equation (3) can be resolved in x in the ring of the integers modulo n.

$$x^{2^k} \equiv g_i^2 \pmod{n} \quad (3)$$

Since the public verification key <v, n> is fixed according to the base numbers from $g_1$ to $g_m$ with m≧1, each base number $g_i$ determines a pair of values GQ2 comprising a public value $G_i$ and a private value $Q_1$: giving m pairs referenced $G_1 Q_1$ to $G_m Q_m$. The public value $G_i$ is the square of the base number $g_i$; giving $G_i \equiv g_i^2$. The private value $Q_i$ is one of the solutions to the equation (3) or else the inverse (mod n) of such a solution.

Just as the modulus n is broken down into f prime factors, the ring of the integers modulo n are broken down into f Galois fields, from $CG(p_1)$ to $CG(p_f)$. Here are the projections of the equations (1), (2) and (3) in $CG(p_j)$.

$$x^2 \equiv g_i \pmod{p_j} \quad (1.a)$$

$$x^2 \equiv -g_i \pmod{p_j} \quad (2.a)$$

$$x^{2^k} \equiv g_i^2 \pmod{p_j} \quad (3.a)$$

Each private value $Q_i$ can be represented uniquely by f private components, one per prime factor: $Q_{i,j} \equiv Q_i \pmod{p_j}$. Each private component $Q_{i,j}$ is a solution to the equation (3.a) or else the inverse (mod $p_j$) of such a solution. After all the possible solutions to each equation (3.a) have been computed, the Chinese remainder technique sets up all the possible values for each private value $Q_i$ on the basis of f components of $Q_{i,1}$ to $Q_{i,f}$. $Q_i$=Chinese remainders $(Q_{i,1}, Q_{i,2}, \ldots Q_{i,f})$ so as to obtain all the possible solutions to the equation (3).

The following is the Chinese remainder technique: let there be two positive integers that are mutally prime numbers a and b such that 0<a<b, and two components $X_a$ from 0 to a−1 and $X_b$ from 0 to b−1. It is required to determine X=Chinese remainders $(X_a, X_b)$, namely the unique number X from 0 to a.b−1 such that $X_a \equiv X \pmod{a}$ and $X_b \equiv X \pmod{b}$. The following is the Chinese remainder parameter: $\alpha \equiv \{b \pmod{a}\}^{-1} \pmod{a}$. The following is the Chinese remainder operation: $\epsilon \equiv X_b \pmod{a}$; $\delta = X_a - \epsilon$; if $\delta$ is negative, replace $\delta$ by $\delta+a$; $\gamma \equiv \alpha$. $\delta \pmod{a}$; $X = \gamma \cdot b + X_b$.

When the prime factors are arranged in rising order, from the smallest $p_1$ to the greater $p_f$, the Chinese remainder parameters can be the following (there are f−1 of them, namely one less than prime factors). The first Chinese remainder parameter is $\alpha \equiv \{p_2 \pmod{p_1}\}^{-1} \pmod{p_1}$. The second Chinese remainder parameter is $\beta \equiv \{p_1 \cdot p_2 \pmod{p_3}\}^{-1} \pmod{p_3}$. The i-th Chinese remainder parameter is $\lambda \equiv \{p_1 \cdot p_2 \cdot \ldots \cdot p_{i-1} \pmod{p_i}\}^{-1} \pmod{p_i}$. And so on and so forth. Finally, in f−1 Chinese remainder operations, a first result (mod $p_2$ times $p_1$) is obtained with the first parameter and then a second result (mod $p_1 \cdot p_2$ times $p_3$) with the second parameter and so on and so forth until a result (mod $p_1 \ldots p_{f-1}$ times $p_f$), namely (mod n).

There are several possible depictions fo the private key GQ2, which expresses the polymorphic nature of the private key GQ2. The various depictions prove to be equivalent: they all amount to knowledge of the factorization of the module n which is the true private GQ2 key. If the depiction truly affects the behavior of the signing entity or self-authenticating entity, it soes not affect the behavior of the controller entity.

Here are the main three possible depictions of the GQ2 private key.

1) The standard representation in GQ technology consists of the storage of m private values $Q_i$ and the public verification key <v, n>; in GQ2, this depictionis rivalled by the following two. 2) The optimal representation in terms of work load consists in storing the public exponent v, the f prime factors $p_j$, m.f private components $Q_{i,j}$ and f−1 parameters of the Chinese remainders. 3) The optimal representation in terms of private key size consists in storing the public exponent v, the m basic numbers $g_i$ and the f prime factors $p_j$, then in starting eachuse by setting up either m private values $Q_i$ and the module n to return to the first depiction or else m.f private components $Q_{i,j}$ and f−1 parameters of the Chinese remainders to return to the second one.

The signing or self-authenticating entities can all use the same base numbers. Unless otherwise indicated, the m base numbers from $g_1$ to $g_m$ can then advantageously be the m first prime numbers;

Because the security of the dynamic authentication mechanism or digital signature mechanism is equivalent to knowledge of a breakdown of the modulus, the GQ2 technology cannot be used to simply distinguish two entities using the same modulus. Generally, each entity that authenticates itself or signs has its own GQ2 modulus. However, it is possible to specify GQ2 moduli with four prime factors, two of which are known by an entity and the other two by another entity.

Here is a first set of GQ2 keys with k=6, giving v=64, m=3, giving three base: $g_1$=3, $g_2$=5 et $g_3$=7, and f=3, namely a modulus with three prime factors: two congruent to 3 (mod 4) and one to 5 (mod 8). It must be noted that g=2 is incompatible with a prime factor congruent to 5 (mod 8).

$p_1$=03CD2F4F21E0EAD60266D5CFCEBB6954683493E2E833

$p_2$=0583B097E8D8D777BAB3874F2E76659BB614F985EC1B $p_3$=0C363CD93D6B3FEC78EE13D7BE9D84354B8FDD6DA1FD n=$p_1 \cdot p_2 \cdot p_3$=FFFF81CEA149DCF2F72EB449C5724742FE2A3630D9
02CC00EAFEE1B957F3BDC49BE9CBD4D94467B72AF28CFBB26144
CDF4BBDBA3C97578E29CC9BBEE8FB6DDDD $Q_{1,1}$=0279C60D216696CD6F7526E23512DAE090CFF879FDDE $Q_{2,1}$=7C977FC38F8413A284E9CE4EDEF4AEF35BF7793B89

$Q_{3,1}$=6FB3B9CO5A03D7CADA9A3425571EF5ECC54D7A7B6F $Q_{1,2}$=0388EC6AA1E87613D832E2B80E5AE8C1DF2E74BFF502

$Q_{2,2}$=04792CE70284D16E9A158C688A7B3FEAF9C400
56469E
$Q_{3,2}$=FDC4A8E53E185A4DA793E93BEE5C636DA731
BDCA4E
$Q_{1,3}$=07BC1AB048A2EAFDAB59BD40CCF2F657AD8
A6B573BDE
$Q_{2,3}$=0AE8551E116A3AC089566DFDB3AE003CF174F
C4E4877
$Q_{3,3}$=01682D490041913A4EA5B80D16B685E4A6DD88
070501
$Q_1$=D7E1CAF28192CED6549FF457708D50A7481572D
D5F2C335D8
C69E22521B510B64454FB7A19AEC8D06985558E764
C6991B05FC2A
C74D9743435AB4D7CF0FF6557
$Q_2$=CB1ED6B1DD649B89B9638DC33876C98AC7AF6
89E9D1359E4
DB17563B9B3DC582D5271949F3DBA5A70C108F561A
274405A5CB8
82288273ADE67353A5BC316C093
$Q_3$=09AA6F4930E51A70CCDFA77442B10770DD1CD7
7490E3398A
AD9DC50249C34312915E55917A1ED4D83AA3D607E
3EB5C8B197
697238537FE7A0195C5E8373EB74D

The following is a second set of GQ2 keys, with k=9, that is v=512, m=2, that is two base numbers: $g_1$=2 and $g_2$=3, and f=3, giving a modulus with three prime factors congruent to 3 (mod 4).
$p_1$=03852103E40CD4F06FA7BAA9CC8D5BCE96E9845
70CB
$p_2$=062AC9EC42AA3E688DC2BC871C8315CB939089B
61DD7
$p_3$=0BCADEC219F1DFBB8AB5FE808A0FFCB5345828
4ED8E3
n=$p_1.p_2.p_3$=FFFF5401ECD9E537F167A80C0A9111986F
7A8EBA4D
6698AD68FF670DE5D9D77DFF00716DC7539F7CBBC
F969E73A0C49
761B276A8E6B6977A21D51669D039F1D7
$Q_{1,1}$=0260BC7243C22450D566B5C6EF74AA29F2B927
AF68E1
$Q_{2,1}$=0326C12FC7991ECDC9BB8D7C1C4501BE1BAE
9485300E
$Q_{1,2}$=02D0B4CC95A2DD435D0E22BFBB29C59418306
F6CD00A
$Q_{2,2}$=O45ECB881387582E7C556887784D2671CA118E2
2FCF2
$Q_{1,3}$=B0C2B1F808D24F6376E3A534EB555EF54E6AEF
5982
$Q_{2,3}$=0AB9F81DF462F58A52D937E6D81F48FFA4A87
A9935AB
$Q_1$=27F7B9FC82C19ACAE47FE9560C3536A7E90F8C3
C51E13C
35F32FD8C6823DF753685DD63555D2146FCDB9B28
DA367327DD6
EDDA092D0CF108D0AB708405DA46
$Q_2$=230D0B9595E5AD388F1F447A69918905EBFB0591
0582E5BA64
9C94B0B2661E49DF3C9B42FEF1F37A7909B1C2DD54
113ACF87C6
F11F19874DE7DC5D1DF2A9252D Dynamic Authentication The dynamic authentication mechanism is designed to prove, to an entity known as a controller, the authenticity of another entity known as a demonstrator as well as the authenticity of a possible associated message M, so that the controller can be sure that it is truly the demonstrator and, as the case may be, only the demonstrator and that the demonstrator is truly speaking of the same message M. The associated message M is optional. This means that it may be vacant.

The dynamic authentication mechanism is a sequence of four acts: an act of commitment, and act of challenge, and act of response and an act of checking. The demonstrator fulfills the acts of commitment and response. The controller fulfills the acts of challenge and control.

Within the demonstrator, it is possible to isolate a witness so as to isolate the most sensitive parameters and functions of the demonstrator, namely the production of commitments and responses. The witness has the parameter k and the private key GQ2, namely the factorization of the module n according to one of the three depictions referred to here above: ● the f prime factors and the m base numbers, ● the m.f private component, the f prime factors and the f–1 parameters of the Chinese remainders, ● the m private values and the modulus n.

The witness may correspond to a partial embodiment, for example, ∝ a chip card connected to a PC forming the entire demonstrator or again, ∝ specially protected programs within a PC, or again, ● specially protected programs within a smart card. The witness thus isolated is similar to the witness defined here below within the signing party. At each execution of the mechanism, the witness produces one or more commitments R and then as many responses D to as many challenges d. Each set {R, d, D} is a GQ2 triplet.

Apart from comprising the witness, the demonstrator also has, if necessary, a hashing function and a message M.

The controller has the modulus n and the parameters k and m; if necessary, it also has the same hashing function and a message M'. The controller is capable of reconstituting a commitment R' from any challenge d and any response D. The parameters k and m inform the controller. Failing any indication to the contrary, the m base numbers from $g_1$ to $g_m$ are the m first prime numbers. Each challenge d must have m elementary challenges referenced from $d_1$ to $d_m$: one per base number. This elementary challenge from $d_1$ to $d_m$ may take a value of 0 to $2^{k-1}-1$ (the values of v/2 to v−1 are not used). Typically, each challenge is encoded by m times k−1 bits (and not by m times k bits). For example, k=6 and m=3 and the base numbers 3, 5 and 7, each challenge has 15 bits transmitted on two bytes; with k=9, m=2 and the base numbers 2 and 3, each challenge has 16 bits transmitted on two bytes. When the (k−1).m possible challenges are also possible, the value (k−1) .m determines the security provided by each GQ2 triplet: an impostor who, by definition, does not know the factorization of the module n has exactly one chance of success in $2^{(k-1).m}$. When (k−1).m is equal to 15 to 20, one triplet is enough to reasonably provide for dynamic authentication. To achieve any security level, it is possible to produce triplets in parallel. It is also possible to produce sequentially, namely to repeat the execution of the mechanism.

1) The act of commitment comprises the following operations.

When the witness has m private values from $Q_1$ to $Q_m$ and the modulus n, it draws one or more random values r (0<r<n) at random and privately; then by k successive squaring (mod n) operations, it converts each random value r into a commitment R.

$$R \equiv r^v (\mod n)$$

Here is an example with the first set of keys with k=6.
r=B8AD426C1A10165E94AC2437C1B1797EF562CF
A53A4AF8

43131FF1C89CFDA131207194710EF9C010E8F09C6
0D9815121981260
919967C3E2FB4B4566088E
R=FFDD736B666F41FB771776D9D50DB7CDF03F3
D976471B25C56
D3AF07BE692CB1FE4EE70FA77032BECD8411B813
B4C21210C6B04
49CC4292E5DD2BDB00828AF18

When the witness has f prime factors from $p_1$ to $p_f$ and m.f private components $Q_{i,j}$, it draws one or more collections of f random values at random and privately: each collection has one random value $r_i$ per prime factor $p_i$ ($0<r_i<p_i$); then by k successive operations of squaring (mode $p_i$), it converts each random value $r_i$ into a component of commitment $R_i$.

$R_i \equiv r_i^v (\bmod p_i)$

Here is an example with the second set of keys with k=9.
$r_1$=B0418EABEBADF0553A28903F74472CD49DD8
C82D86
$R_1$=022B365F0BEA8E157E94A9DEB0512827FFD51
49880F1
$r_2$=75A8DA8FE0E60BD55D28A218E31347732339F1
D667
$R_2$=057$^E$43A242C485FC20DEEF291C774CF1B30F01
63DEC2
$r_3$=0D74D2BDA5302CF8BE2F6D406249D148C6960
A7D27
$_3$=06$^E$14C8FC4DD312BA3B475F1F40CF01ACE2A88
D5BB3C For each collection of f commitment components, the witness sets up a commitment according to the technique of Chinese remainders. There are as many commitments as there are collections of random values.

R=Chinese remainders ($R_1, R_2, \ldots, R_f$)

R=28AA7F12259BFBA81368EB49C93EEAB3F3EC6
BF73B0EBD7
D3FC8395CFA1AD7FC0F9DAC169A4F6F1C46FB4C
3458D1E37C9
9123B56446F6C928736B17B4BA4A529

In both cases, the demonstrator sends the controller all or part of each commitment R, or at least a hashing code II obtained by hashing each commitment R and one message M.

2) The act of challenge consists in drawing at random one or more challenges d each consisting of m elementary challenges $d_1|d_2| \ldots |d_m$; each elementary challenge $d_i$ takes one of the values from 0 to v/2−1.

$d = d_1|d_2| \ldots |d_m$

Here is an example for the first set of keys with k=6 and m=3.
$d_1$=10110=22='16';  $d_2$=00111=7;
$d_3$=00010=2d=0||$d_1$||$d_2$||$d_3$=01010000 11100010=58
E2

Here is an example for the second set of keys with k=9 and m=2.
d=$d_1$||$d_2$=58 E2, that is, in decimal notation 88 and 226
The controller sends the demonstrator each challenge d.

3) The act of response has the following operations.
When the witness has m private values from $Q_1$ to $Q_m$ and the modulus n, it computes one or more responses D in using each random value r of the act of commitment and the private values according to the elementary challenges.

$X = Q_1^{d1} \cdot Q_2^{d2} \ldots Q_m^{dm} (\bmod n)$ $D \equiv r \cdot X (\bmod n)$ Here is an example for the first set of keys.
D=FF257422ECD3C7A03706B9A7B28EE3FC3A4E97
4AEDCDF386
5EEF38760B859FDB5333E904BBDD37B097A989F690
85FE8EF6480 A2C6A290273479FEC9171990A17

When the witness has f prime factors from $p_i$ to $p_f$ and m.f private components $Q_{i,j}$, it computes one or more collections of f response components in using each collection of random values of the act of commitment: each collection of response components comprises one component per prime factor.

$X_i = Q_1^{d1} \cdot Q_2^{d2} \ldots Q_m^{dm}{}_{,1} (\bmod p_i)$ $D_i \equiv r_i \cdot X_i (\bmod p_1)$ Here is an example for the second set of keys.
$D_1 = r_1 \cdot Q_{1.1}^{d1} \cdot Q_{2.1}^{d2} (\bmod p_1) =$
O2660ADF3C73B6DC15E196152322DDE8EB35775
E38
$D_2 = r_2 \cdot Q_{1.2}^{d1} \cdot Q_{2.2}^{d2} (\bmod p_2) =$
04C15028E5FD1175724376C11BE77052205FC62AE
3B
$D_3 = r_3 \cdot Q_{1.3}^{d1} \cdot Q_{2.3}^{d2} (\bmod p_3) =$
0903D20D0C306C8EDA9D8FB5B3BEB55E061AB39
CCF52

For each collection of response components, the witness draws up a response according to the Chinese remainder technique. There are as many responses as there are challenges.

D=Chinese remainders ($D_1, D_2, \ldots, D_f$)
D=85C3B00296426E97897F73C7DC6341FB8FFE6E8
79AE12EF1F36
4CBB55BC44DEC437208CF530F8402BD9C511F5FB
3B3A309257A00
195A7305C6FF3323F72DC1AB In both cases, the demonstrator sends each response D to the controller.

4) The checking act consists in ascertaining that each triplet {R, d, D} verifies an equation of the following type for a non-zero value, $$R \cdot \prod_{i=1}^{m} G_i^{d_i} \equiv D^{2^k}$$

(mod n) or else $$R \equiv D^{2^k} \cdot \prod_{i=1}^{m} G_i^{d_i}$$

(mode n) or else in setting up each commitment: none should be zero.

$$R' \equiv D^{2^k} / \prod_{i=1}^{m} G_i^{d_i}$$

(mode n) or else $$R' \equiv D^{2^k} \cdot \prod_{i=1}^{m} G_i^{d_i}$$

(mode n)

If necessary, the controller then computes a hashing code H' in hashing each re-established commitment $d'$ and a message M'. The dynamic authentication is successful when the controller thus retrieves what it has received at the end of the first act of commitment, namely all or part of each commitment R, or else the hashing code H.

For example, a sequence of elementary operations converts the response D into a commitment R'. The sequence has k squares (mod n) separated by k−1 divisions or multiplications (mod n) by base numbers. For the i-th division or multiplication, which is performed between the i-th square and the i+1st square, the i-th bit of the elementary challenge $d_i$ indicates that it is necessary to use $g_i$, the i-th bit of the elementary challenge $d_2$ indicates whether it is necessary to use $g_2$, . . . up to the i-th bit of the elementary challenge $d_m$ which indicates that it is necessary to use $g_m$.

Here is an example for the first set of keys.

$D^2$ (mod n)=FD12E8E1F1370AEC9C7BA2E05C80AD2B692D341D46F3
2B93948715491F0EB091B7606CA1E744E0688367D7BB998F7B73D5F7
FDA95D5BD6347DC8B978CA217733

$3 . D^2$ (mod n)=F739B708911166DFE715800D8A9D78FC3F332FF622D
3EAB8E7977C68AD44962BEE4DAE3C0345D1CB34526D3B67EBE8BF
987041B4852890D83FC6B48D3EF6A9DF $3^2 . D^4$ (mod n)=682A7AF280C49FE230BEE354BF6FFB30B7519E3C8
92DD07E5A781225BBD33920E5ADABBCD7284966D71141EAA17AF
8826635790743EA7D9A15A33ACC7491D4A7

$3^4 . D^8$ (mod n)=BE9D828989A2C184E34BA8FE0F384811642B7B548F
870699E7869F8ED851FC3DB3830B2400C516511A0C28AFDD210EC3
939E69D413F0BABC6DEC441974B1A291

$3^5 . 5 . D^8$ (mod n)=2B40122E225CD858B26D27B768632923F2BBE5
DB15CA9EFA77EFA667E554A02AD1A1E4F6B59BD9E1AE4A537D
4AC1E89C2235C363830EBF4DB42CEA3DA98CFE00

$3^{10} . 5^2 . D^{16}$ (mod n)=BDD3B34C90ABBC870C604E27E7F2E9DB2D383
68EA46C931C66F6C7509B118E3C162811A98169C30D4DEF768397DD
B8F6526B6714218DEB627E11FACA4B9DB268

$3^{11} . 5^3 . 7 . D^{16}$ (mod n)=DBFA7F40D338DE4FBA73D42DBF427BBF195
C13D02AB0FA5F8C8DDB5025E34282311CEF80BACDCE5D0C433444
A2AF2B15318C36FE2AE02F3C8CB25637C9AD712F $3^{22} . 5^6 . 7^2 . D^{37}$ (mod n)=C60CA9C4A11F8AA89D9242CE717E3DC6C1
A95D5D09A2278F8FEE1DFD94EE84D09D000EA8633B53C4A0E7F0A
EECB70509667A3CB052029C94EDF27611FAE286A7

$3^{22} . 5^7 . D^{32}$ (mod n)=DE40CB6B41C01E722E4F312AE7205F18CDD
0303EA52261CB0EA9F0C7E0CD5EC53D42E5CB645B6BB1A3B00C77
886F4AC5222F9C863DACA440CF5F1A8E374807AC $3^{44} . 5^{14} . 7^4 . D^{64}$ (mod n), namely $3^{2C}.5^E. 7^4 . D^{40}$ with the exponents in hexadecimal notation=FFDD736B666F41FB771776D9D50DB7CDF03F3D9
76471B25C56D3AF07BE692CB1FE4EE70FA77032BECD8411B813B4C
21210C6B0449CC4292E5DD2BDB00828AF18

We find the commitment R. The authentication is successful.

Here is an example for the second set of keys.

$D^2$ (mod n)=C66E585D8F132F7067617BC6D00BA699ABD74FB9D13E
24E6A6692CC8D2FC7B57352D66D34F5273C13F20E3FAA228D70AEC
693F8395ACEF9206B172A8A2C2CCBB $3 . D^2$ (mod n)=534C6114D385C3E15355233C5B00D09C2490D1B8D8E
D3D59213CB83EAD41C309A187519E5F501C4A45C37EB2FF38FBF20
1D6D138F3999FC1D06A2B2647D48283

$3^2 . D^4$ (mod n)=A9DC8DEA867697E76B4C18527DFFC49F4658473D03
4EC1DDE0EB21F6F65978BE477C4231AC9B1EBD93D5D49422408E47
15919023B16BC3C6C46A92BBD326AADF $2 . 3^3 . D^4$ (mod n)=FB2D57796039DFC4AF9199CAD44B66F257A1FF
3F2BA4C12B0A8496A0148B4DFBAFE8E0B5A7D9FB4394379D72A
107E45C51FCDB7462D03A35002D29823A2BB5

$2^2 . 3^6 . D^8$ (mod n)=4C210F96FF6C77541910623B1E49533206DFB9E91
6521F305F12C5DB054D4E1BF3A37FA293854DF02B49283B6DE5E5D
82ACB23DAF1A0D5A721A1890D03A00BD8

$2^2 . 3^7 . D^8$ (mod n)=E4632EC4FE4565FC4B3126B15ADBF996149F2D
BB42F65D911D3851910FE7EA53DAEA7EE7BA8FE9D081DB78B249
B1B18880616B90D4E280F564E49B270AE02388

$2^4 . 3^{14} . D^{16}$ (mod n)=ED3DDC716AE3D1EA74C5AF935DE814BCC
2C78B12A6BB29FA542F9981C5D954F53D153B9F0198BA82690EF
665C17C399607DEA54E218C2C01A890D422EDA16FA3

$2^5 . 3^{14} . D^{16}$ (mod n)=DA7C64E0E8EDBE9CF823B71AB13F17E1161487
6B000FBB473F5FCBF5A5D8D26C7B2A05D03BDDD588164E562D0F5
7AE94AE0AD3F35C61C0892F4C91DC0B08ED6F $2^{10}$. $3^{28}$. $D^{32}$ (mod n)=6ED6AFC5A87D2DD117B0D89072C99FB9DC9 5D558F65B6A1967E6207D4ADBBA32001D3828A35 069B256A07C3D 722F17DA30088E6E739FBC419FD7282D16CD6542

$2^{11}$. $3^{28}$. $D^{32}$ (mod n)=DDAD5F8B50FA5BA22F61B120E5933F73B92 BAAB1ECB6D432CFCC40FA95B77464003A705146 A0D364AD40F8

7AE45E2FB460111CDCE73F78833FAE505A2D9AC A84

$2^{22}$. $3^{56}$. $D^{64}$ (mod n)=A466D0CB17614EFD961000BD9EABF4F021 36F8307101882BC1764DBAACB715EFBF5D8309AE 001EB5DEDA

8F000E44B3D4578E5CA55797FD4BD1F8E919BE78 7BD0

$2^{44}$. $3^{112}$. $D^{128}$ (mod n)=925B0EDF5047EFEC5AFABDC03A830919761 B8FBDD2BF934E2A8A31E29B976274D513007EF12 69E4638B4F65F

8FDEC740778BDC178AD7AF2968689B930D5A2369

$2^{44}$. $3^{113}$. $D^{128}$ (mod n)=B711D89C03FDEA8D1F889134A4F809B3F2D 8207F2AD8213D169F2E99ECEC4FE08038900FOC20 3B55EE4F4C803

BFB912A04F11D9DB9D076021764BC4F57D47834

$2^{88}$. $3^{226}$. $D^{256}$ (mod n)=41A83F119FFE4A2F4AC7E5597A5D0BEB4D4C 08D19E597FD034FE720235894363A19D6BC5AF323 D24B1B7FCFD8D

FCC628021B4648D7EF757A3E461EF0CFF0EA13

$2^{176}$. $3^{452}$. $D^{512}$ (mod n) that is $4^{88}$. $9^{226}$. $D^{512}$ (mod n)=28AA7F12259BFBA8

1368EB49C93EEAB3F3EC6BF73B0EBD7D3FC8395 CFA1AD7FC0F9D

AC169A4F6F1C46FB4C3458D1E37C99123B56446F6 C928736B17B4BA

4A529

We find the commitment R. The authentication is successful.

Digital Signature

The digital signing mechanism enables an entity called a signing party to produce signed messages and an entity called a controller to ascertain signed message. The message M is any binary sequence: it may be vacant. The message M is signed by adding a signature appendix to it. This signature appendix comprises one or more commitments and/or challenges as well as the corresponding responses.

The controller has the same hashing function, the parameters k and m and the module n. The parameters k and m provide information to the controller. Firstly, each elementary challenge from $d_1$ to $d_m$ must take a value from 0 to $2_{k-1}-1$ (the values of v/2 to v−1 are not used). Secondly, each challenge d must comprise m elementary challenges referenced from $d_1$ to $d_m$, namely as many of them as base numbers. Furthermore, failing indications to the contrary, the m base numbers from $g_1$ to $g_m$ are the m first prime numbers. With (k−1).m equal to 15 to 20, it is possible to sign with four triplets GQ2 produced in parallel; with (k−1).m equal to 60 or more, it is possible to sign with a single triplet GQ2. For example, with k=9 and m=8, a single triplet GQ2 is enough; each challenge has eight bytes and the base numbers are 2, 3, 5, 7, 11, 13, 17 and 19.

The signing operation is a sequence of three acts: an act of commitment, an act of challenge and an act of response. Each act produces one or more GQ2 triplets each comprising: a commitment R ($\neq 0$), a challenge d consisting of m elementary challenges referenced $d_1$, $d_2$, . . . , $d_m$ and a response D ($\neq 0$).

The signing party has a hashing function, the parameter k and the GQ2 private key, namely the factorization of the modulus n according to one of the three depictions referred to here above. Within the signing party, it is possible to isolate a witness that performs the the acts of commitment and response, so as to isolate the functions and parameters most sensitive to the demonstrator. To compute commitments and responses, the witness has the parameter k and the GQ2 private key, namely the factorization of the modulus n according to one of the three depictions referred to here above. The witness thus isolated is similar to the witness defined within the demonstrator. It may correspond to a particular embodiment, for example, $\propto$ a chip card connected to a PC forming the entire signing party, or again, $\propto$ programs particularly protected within a PC, or again, $\propto$ programs particularly protected within a chip card.

1) The act of commitment comprises the following operations:

When the witness has m private values from $Q_1$ to $Q_m$ and the modulus n, it randomly and privately draws one or more random values r(0<r<n); then, by k successful squaring (mod n) operations, it converts each random value r into a commitment R.

$$R_i = r^v \pmod{n}$$

When the witness has f prime factors from $p_1$ to $p_f$ and m.f private components $Q_{ij}$, it privately and randomly draws one or more collections of f random values: each collection has one random value $r_i$ per prime factor $p_i$ (0<$r_i$<$p_i$); then, by k successive squaring (mod $p_i$) operations, it converts each random value $r_i$ into a component of commitment $R_i$.

$$R_i = r_i^v \pmod{p_i}$$

For each collection of f commitment components, the witness sets up a commitment according to the Chinese remainder technique. There are as many commitments as there are collections of random values.

$$R = \text{Chinese remainders}(R_1, R_2, \ldots, R_f)$$

2) The act of challenge consists in hashing all the commitments R and the message to be signed M to obtain a hashing code from which the signing party forms one or more challenges each comprising m elementary challenges; each elementary challenge takes a value from 0 to v/2−1; for example with k=9 and m=8. Each challenge has eight bytes. There are as many challenges as there are commitments.

$$d = d_1 | d_2 | \ldots | d_m,$$

extracted from the result Hash(M, R)

3) The act of response comprises the following operations.

When the witness has m private values from $Q_1$ to $Q_m$ and the modulus n, it computes one or more responses D using each random value r of the act of commitment and the private values according to the elementary challenges.

$$X. = Q_1^{d_1} . Q_2^{d_2} \ldots Q_m^{d_m} \pmod{n}$$

$$D| = r. |X.| \pmod{n}$$

When the witness has f prime factors from $p_1$ to $p_f$ and m.f private components $Q_{ij}$, it computes one or more collections of f response components in using each collection of random values of the act of commitment: each collection of response components comprises one component per prime factor.

$$X_i \equiv Q_{1,i}^{d1} \cdot Q_{2,i}^{d2} \ldots Q_{m,i}^{dm} \pmod{p_i}$$

$$D_i \equiv r_i \cdot X_i \pmod{p_i}$$

Figure 4:
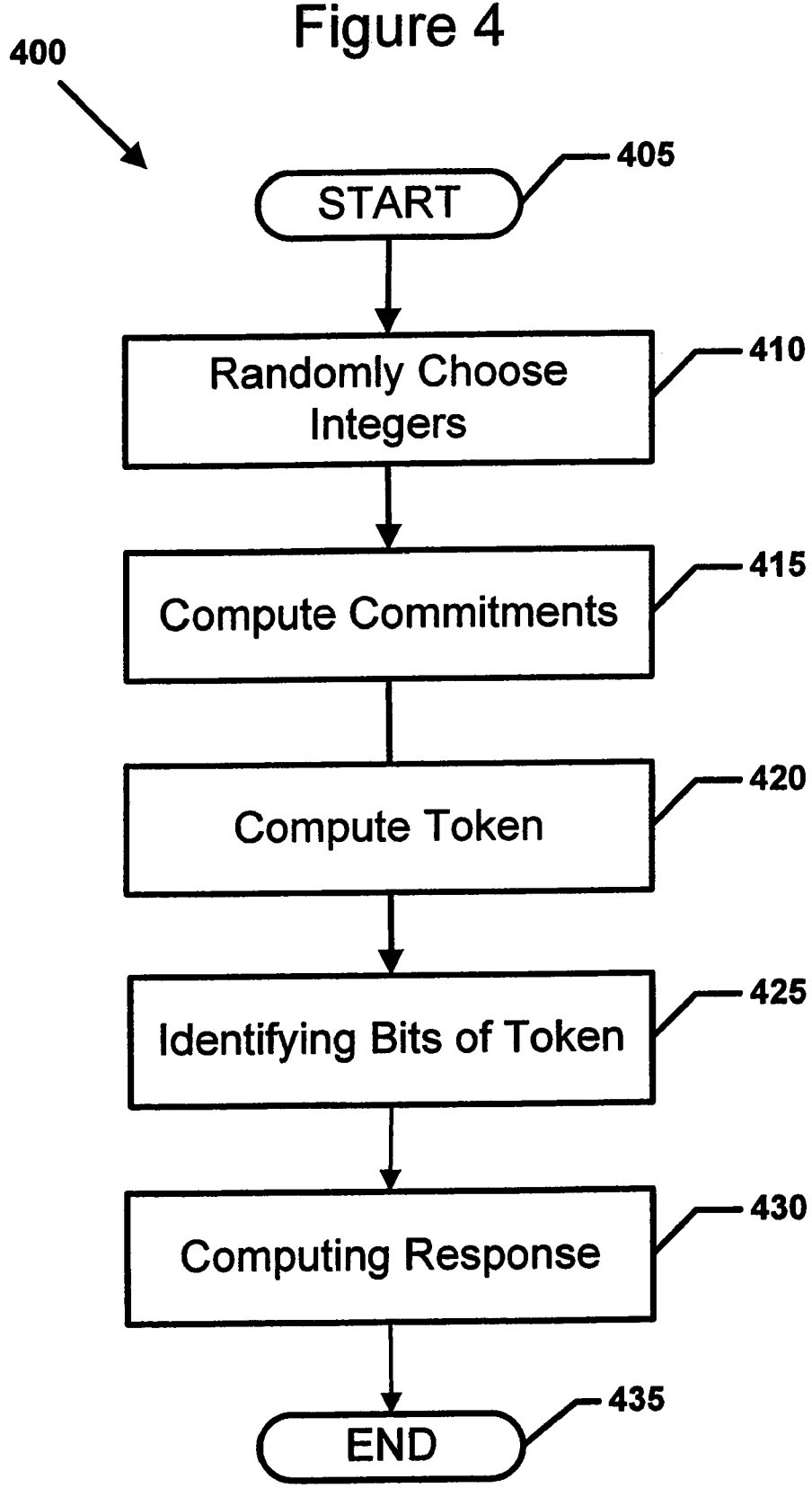
FIG. 4 is a flow chart representing the main steps of a process designed to sign a message.

Referring now to FIG. 4, a process 400 is shown. The process 400 begins at operation 405 and proceeds to operation 410 in which integers are randomly chosen. The process 400 then proceeds to operation 415 in which commitments are computed. Tokens are computed in operation 420 and bits of the tokens are identified in operation 425. The process 400 then proceeds to operation 430 in which a response is computed. The process ends at operation 435.

For each collection of response components, the witness sets up a response according to the Chinese remainders technique. There are as many responses as there are challenges.

D=Chinese remainders $(D_1, D_2, \ldots, D_f)$

The signing party signs the message M in adding to it a signature appendix comprising:
 either each GQ2 triplet, namely each commitment R, each challenge d and each response D,
 or else each commitment R and each corresponding response D,
 or else each challenge d and each corresponding response D.

The running of the verification operation depends on the contents of the signature appendix. There are three possible cases.

Should the appendix comprise one or more triplets, the checking operation has two independent processes for which the chronology is not important. The controller accepts the signed message if and only if the two following conditions are fulfilled.

Firstly, each triplet must be consistent (an appropriate relationship for the following type has to be verified) and acceptable (the comparison has to be done on a non-zero value).

$$R \cdot \prod_{i=1}^{m} G_i^{d_i} \equiv D^{2^k}$$

mod n) or else $$R \equiv D^{2^k} \cdot \prod_{i=1}^{m} G_i^{d_i}$$

(mod n)

For example, the response D is converted by a sequence of elementary operations: k squared (mod n) separated by k−1 multiplication or division operations (mod n) by base numbers. For the i-th multiplication or division which is performed between the i-th square and the i+1st square, the i-th bit of the elementary challenge $d_1$ indicates whether it is necessary to use $g_1$, the i-th bit of the elementary challenge $d_2$ indicates whether it is necessary to use $g_2$, ... up to the i-th bit of the elementary challenge $d_m$ which indicates if it is necessary to use $g_m$. It is thus necessary to retrieve each commitment R present in the signature appendix.

Furthermore, the triplet or triplets must be linked to the message M. By hashing all the commitments R and the message M, a hashing code is obtained from which each challenge d must be recovered.

$d=d_1|d_2|\ldots|d_m$, identical to those extracted from the result Hash (M, R)

Should the appendix have no challenge, the checking operation starts with a reconstruction of one or more challenges d' by hashing all the commitments R and the message M.

$$D'=d'_1|d'_2|\ldots|d'_m,$$

extracted from the result Hash(M, R)

Then, the controller accepts the signed message if and only if each triplet is consistent (an appropriate relationship of the following type is verified) and acceptable (the comparison is done on a non-zero value).

$$R \cdot \prod_{i=1}^{m} G_i^{d'_i} \equiv D^{2^k}$$

(mod n) or else $$R \equiv D^{2^k} \cdot \prod_{i=1}^{m} G_i^{d'_i}$$

(mod n)

Should the appendix comprise no commitment, the checking operation starts by reconstructing one or more commitments R' according to one of the following two formulae, namely the one that is appropriate. No re-established commitment should be zero.

$$R' \equiv D^{2^k} \Big/ \prod_{i=1}^{m} G_i^{d_i}$$

(mod r') or else $$R' \equiv D^{2^k} \cdot \prod_{i=1}^{m} G_i^{d_i}$$

(mod n)

Then, the controller must hash all the commitments R' and the message M so as to reconstitute each challenge d.

$d=d_1|d_2|\ldots|d_m$, identical to those extracted from the result Hash(M, R)

The controller accepts the signed message if and only if each reconstituted challenge is identical to the corresponding challenge in the appendix.

Figure 5:
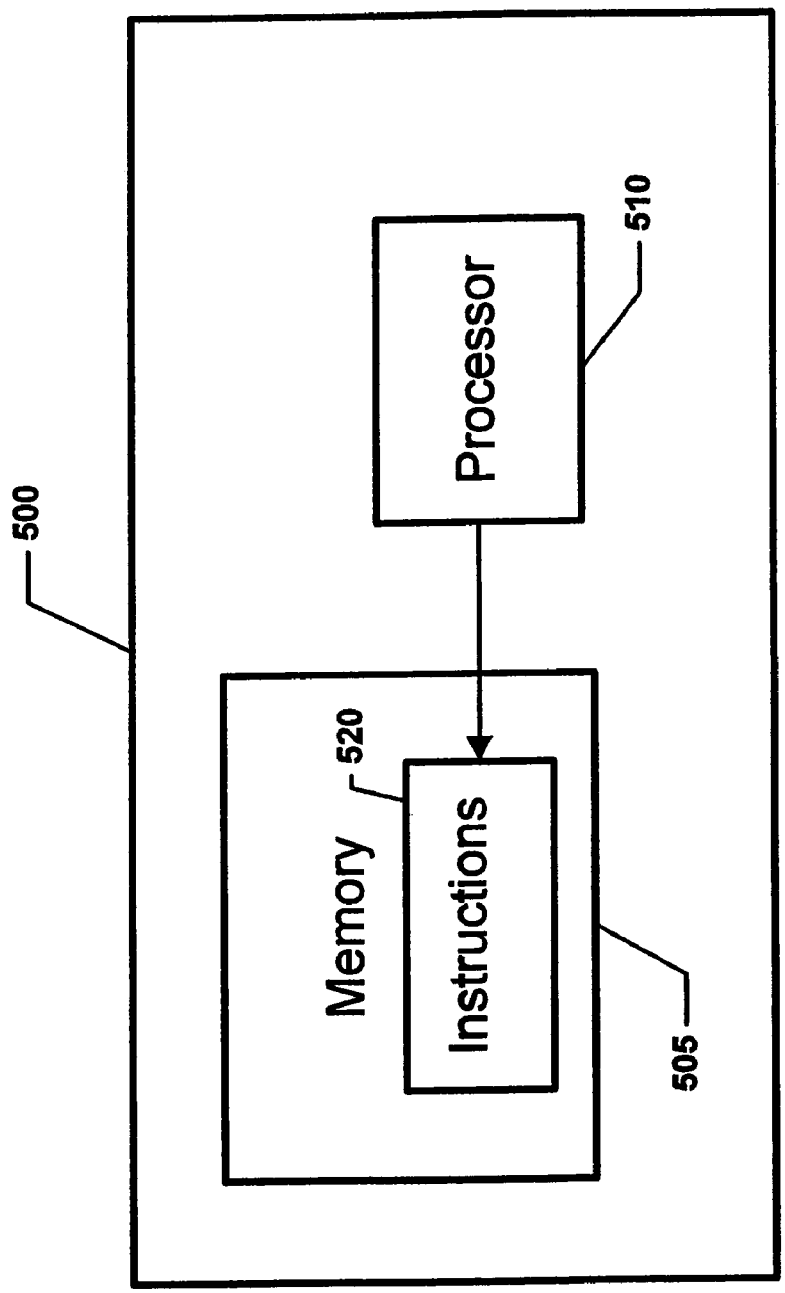
FIG. 5 shows the implementation of the process on a system including a memory storing instructions which are executed by a processor.

Referring now to FIG. 5, the above noted methods can be implemented on a system 500 including a memory 505 storing instructions 520 which are executed on a processor 510.

In the present application, it has been shown that there are pairs of private values and public values Q and G respectively used to implement the method, system and device according to the invention, designed to prove the authenticity of an entity and/or integrity and/or authenticity of a message.

In the pending application filed on the same day as the present application by France Télécom, TDF and the firm Math RiZK, whose inventors are Louis Guillou and Jean- Jacques Quisquater, a method has been described for the production of sets of GQ2 keys namely moduli n and pairs of public and private values G and Q respectively when the exponent v is equal to $2^k$. This patent application is incorporated herein by reference.

The invention claimed is:

1. A computer implemented process comprising:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \bmod n$ or the equation $G_i \equiv Q_i^v \bmod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \bmod n$, wherein $g_i$ for $i=1, \ldots, m$ is a base number having an integer value greater than 1 and smaller than each of the prime factors $p_i, \ldots p_f$ and $g_i$ is a non-quadratic residue of the ring of integers modulo n;

receiving a commitment R from a demonstrator, the commitment R having a value computed such that: $R=r^v \bmod n$, wherein r is an integer randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D having a value computed such that: $D=r \bullet Q_1^{d_1} \bullet Q_2^{d_2} \bullet \ldots \bullet Q_m^{d_m} \bmod n$; and determining that the demonstrator is authentic if the response D has a value such that: $D^v \bullet G_1^{\epsilon_1 d_1} \bullet G_2^{\epsilon_2 d_2} \bullet \ldots \bullet G_m^{\epsilon_m d_m} \bmod n$ is equal to the commitment R, wherein, for $i=1, \ldots, m$, $\epsilon_i=+1$ in the case $G_i \bullet Q_i^v \equiv 1 \bmod n$ and $\epsilon_i=-1$ in the case $G_i \equiv Q_i^v \bmod n$.

2. The computer implemented process according to claim 1, wherein the challenges are such that $0 > d_i > 2^k - 1$ for $i=1, \ldots, m$.

3. A computer implemented process comprising:

obtaining a set of one or more private values $Q_1, Q_2, \ldots, Q_m$ and respective public values $G_1, G_2, \ldots, G_m$, each pair of values $Q_i$, $G_i$ verifying either the quation $G_i \cdot Q_i^v \equiv 1 \bmod n$ or the equation $G_i \equiv Q_i^v \bmod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, wherein v is a public exponent such that $v=2^k$, and wherein k is a security parameter having an integer value greater than 1, and wherein each public value $G_i$ for $i=1, \ldots, m$ is such that $G_i \equiv g_i^2 \bmod n$, wherein $g_i$ for $i=1, \ldots, m$ is a base number having an integer value greater than 1 and smaller than each of the prime factors $p_1, \ldots, p_f$ and $g_i$ is a non-quadratic residue of the ring of integers modulo n;

receiving a commitment R from a demonstrator, the commitment R having a value computed using the Chinese remainder method from a series of commitment components $R_j$, the commitment components $R_j$ having a value such that: $R_j = r_j^v \bmod p_j$ for $j=1, \ldots, f$, wherein $r_1, \ldots, r_f$ is a series of integers randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D being computed from a series of response components $D_j$ using the Chinese remainder method, the response components $D_j$ having a value such that: $D_j = r_j \bullet Q_{1,j}^{d_1} \bullet Q_{2,j}^{d_2} \bullet \ldots \bullet Q_{m,j}^{d_m} \bmod p_j$ for $j=1, \ldots, f$, wherein $Q_{i,j} = Q_i \bmod p_j$ for $i=1, \ldots, m$ and $j=1, \ldots, f$; and determining that the demonstrator is authentic if the response D has a value such that: $D^v \bullet G_1^{\epsilon_1 d_1} \bullet G_2^{\epsilon_2 d_2} \bullet \ldots \bullet G_m^{\epsilon_m d_m} \bmod n$ is equal to the commitment R, wherein, for $i=1, \ldots, m$, $\epsilon_i=+1$ in the case $G_i \bullet Q_i^v \equiv 1 \bmod n$ and $\epsilon_i=-1$ in the case $G_i \equiv Q_i^v \bmod n$.

4. The computer implemented process according to claim 3, wherein the challenges are such that $0 \leq d_i \leq 2^k - 1$ for $i=1, \ldots, m$.

5. A computer implemented process comprising:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \bmod n$ or the equation $G_i \equiv Q_i^v \bmod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \bmod n$, wherein $g_i$ for $i=1, \ldots, m$ is a base number having an integer value greater than 1 and smaller than each of the prime factors $p_1, \ldots, p_f$ and $g_i$ is a non-quadratic residue of the ring of integers modulo n;

receiving a token T from a demonstrator, the token T having a value such that $T=h(M, R)$, wherein h is a hash function, M is a message received from the demonstrator, and R is a commitment having a value computed such that: $R=r^v \bmod n$, wherein r is an integer randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D having a value such that: $D=r \bullet Q_{1hu\ d}^{d_1} \bullet Q_2^{d_2} \bullet \ldots \bullet Q_m^{d_m} \bmod n$; and determining that the message M is authentic if the response D has a value such that: $h(M, D^v \bullet G_1^{\epsilon_1 d_1} \bullet G_2^{\epsilon_2 d_2} \bullet \ldots \bullet G_m^{\epsilon_m d_m} \bmod n)$ is equal to the token T, wherein, for $i=1, \ldots, m$, $\epsilon_i=+1$ in the case $G_i \bullet Q_i^v \equiv 1 \bmod n$ and $\epsilon_i=-1$ in the case $G_i \equiv Q_i^v \bmod n$.

6. The computer implemented process according to claim 5, wherein the challenges are such that $0 \leq d_i \leq 2^k - 1$ for $i=1, \ldots, m$.

7. A computer implemented process comprising:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \bmod n$ or the equation $G_i \equiv Q_i^v \bmod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \mod n$, wherein $g_i$ for $i=1, \ldots, m$ is a base number having an integer value greater than 1 and smaller than each of the prime factors $p_1, \ldots, p_f$, and $g_i$ is a non-quadratic residue of the ring of integers modulo n;

receiving a token T from a demonstrator, the token T having a value such that $T=h(M, R)$, wherein h is a hash function, M is a message received from the demonstrator, and R is a commitment having a value computed out of commitment components $R_j$ by using the Chinese remainder method, the commitment components $R_j$ having a value such that: $R_j = r_j^v \mod p_j$ for $j=1, \ldots, f$, wherein $r_1, \ldots r_f$ is a series of integers randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D being computed from a series of response components $D_j$ using the Chinese remainder method, the response components $D_j$ having a value such that: $D_j = r_j \bullet Q_{1,j}^{d_1} \bullet Q_{2,j}^{d_2} \bullet \ldots \bullet Q_{m,j}^{d_m} \mod p_j$ for $j=1, \ldots, F$, wherein $Q_{i,j} = Q_i \mod p_j$ for $i=1, \ldots, m$ and $j=1, \ldots, f$; and determining that the message M is authentic if the response D has a value such that: $h(M, D^v \bullet G_1^{\epsilon_1 d_2} \bullet \ldots \bullet G_m^{\epsilon_m d_m} \mod n)$ is equal to the token T, wherein, for $i=1, \ldots, m$, $\epsilon_i = +1$ in the case $G_i \bullet Q_i^v = 1 \mod n$ and $\epsilon_i = -1$ in the case $G_i = Q_i^v \mod n$.

8. The computer implemented process according to claim 7, wherein the challenges are such that $0 \leq d_i \leq 2^k - 1$ for $i=1, \ldots, m$.

9. A computer implemented process comprising:

obtaining a set of on eor more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \mod n$ or the equation $G_i \equiv Q_i^v \mod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \mod n$, wherein $g_i$ for $i=1, \ldots, m$ is a base number having an integer value greater than 1 and smaller than each of the prime factors $p_1, \ldots, p_f$, and $g_i$ is a non-quadratic residue of the ring of integers modulo n;

recording a message M to be signed;

choosing m integers $r_i$ randomly, wherein i is an integer between 1 and m;

computing commitments $R_i$ having a value such that: $R^i = r_i^v \mod n$ for $i=1, \ldots, m$;

computing a token T having a value such that $T=h(M, R_1, R_2, \ldots, R_m)$, wherein h is a hash function producing a binary train consisting m bits;

identifying the bits $d_1, d_2, \ldots, d_m$ of the token T;

computing responses $D_i = r_i \cdot Q_i^{d_i} \mod n$ for $i=1, \ldots, m$; and performing at least one of transmitting the token T and the response Di to at least one verifying entity, or storing the token T and the response Di on a database accessible to the public or to at least one verifying entity.

10. The computer implemented process according to claim 9, further comprising:

collecting the token T and the responses $D_i$ for $i=1, \ldots, m$; and determining that the message M is authentic if the responses $D_i$ have a value such that:

$h(M, D_1^v \cdot G_1^{\epsilon_1 d_1} \mod n, D_2^v \cdot G_2^{\epsilon_2 d_2} \mod n, \ldots, D_m^v \cdot G_m^{\epsilon_m d_m} \mod n)$ is equal to the token T, wherein, for $i=1, \ldots, m$, $\epsilon_1 = +1$ in the case $G_i \cdot Q_i^v = 1 \mod n$ and $\epsilon_i = -1$ in the case $G_i = Q_i^v \mod n$.

11. A memory storing instructions which when executed cause a processor to execute the following method:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \mod n$ or the equation $G_i \equiv Q_i^v \mod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \mod n$, wherein $g_i$ for $i=1, \ldots, m$ is a base number having an integer value greater than 1 and smaller than each of the prime factors $p_1, \ldots, p_f$, and $g_i$ is a non-quadratic residue of the ring of integers modulo n;

receiving a commitment R from a demonstrator, the commitment R having a value computed such that: $R = r^v \mod n$, wherein r is an integer randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D having a value computed such that: $D = r \cdot Q_1^{d_1} \cdot Q_2^{d_2} \cdot \ldots \cdot Q_m^{d_m} \mod n$; and determining that the demonstrator is authentic if the response D has a value such that: $D^v \cdot G_1^{\epsilon_1 d_1} \cdot G_2^{\epsilon_2 d_2} \cdot \ldots \cdot G_m^{\epsilon_m d_m} \mod n$ is equal to the commitment R, wherein, for $i=1, \ldots, m$, $\epsilon_i = +1$ in the case $G_i \cdot Q_i^v = 1 \mod n$ and $\epsilon_i = -1$ in the case $G_i = Q_i^v \mod n$.

12. The memory according to claim 11, wherein the challenges are such that $0 \leq d_i \leq 2^k - 1$ for $i=1, \ldots, m$.

13. A memory storing instructions which when executed cause a processor to execute the following method:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1 \mod n$ or the equation $G_i \equiv Q_i^v \mod n$, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v=2^k$, and wherein k is a security parameter having an integer value greater than 1, and wherein each public value $G_i$ for $i=1, \ldots, m$ is such that $G_i \equiv g_i^2 \mod n$, wherein $g_i$ for $i=1, \ldots, m$ is a base number having an integer value greater than 1 and smaller than each of the prime factors $p_1, \ldots, p_f$, and $g_i$ is a non-quadratic residue of the ring of integers modulo n;

receiving a commitment R from a demonstrator, the commitment R having a value computed using the Chinese remainder method from a series of commitment components $R_j$, the commitment components $R_j$ having a value such that: $R_j = r_j^v \mod p_j$ for $j=1, \ldots, f$, wherein $r_1, \ldots, r_f$ is a series of integers randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D being computed from a series of response components $D_j$ using the Chinese remainder method, the response components $D_j$ having a value such that: $D_j = r_j \cdot Q_{1,j}^{d_1} \cdot$ $Q_{2,j}^{d_2} \cdot \ldots \cdot Q_{m,j}^{d_m}$ mod $p_j$ for j=1, ..., f, wherein $Q_{i,j}=Q_i$ mod $p_j$ for i=1, ..., m and j=1, ..., f; and determining that the demonstrator is authentic if the response D has a value such that: $D^v \cdot G_1^{\epsilon_1 d_1} \cdot G_2^{\epsilon_2 d_2} \cdot \ldots \cdot G_m^{\epsilon_m d_m}$ mod n is equal to the commitment R, wherein, for i=1, ..., m, $\epsilon_i$=+1 in the case $G_i \cdot Q_i^v$=1 mod n and $\epsilon_i$=−1 in the case $G_i = Q_i^v$ mod n.

14. The memory according to claim 13, wherein the challenges are such that $0 \leq d_i \leq 2^k - 1$ for i=1, ..., m.

15. A memory storing instructions which when executed cause a processor to execute the following method:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v = 2^k$, and wherein k is a security parameter having an integer value greater than 1, and wherein each public value $G_i$ for i=1, ..., m is such that $G_i \equiv g_i^2$ mod n, wherein $g_i$ for i=1, ..., m is a base number having an integer value greater than 1 and smaller than each of the prime factors $p_1, \ldots, p_f$, and $g_i$ is a non-quadratic residue of the ring of integers modulo n;

receiving a token T from a demonstrator, the token T having a value such that T=h(M, R), wherein h is a hash function, M is a message received from the demonstrator, and R is a commitment having a value computed such that: $R = r^v$ mod n, wherein r is an integer randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D having a value such that: $D = r \cdot Q_1^{d_1} Q_2^{d_2} \cdot \ldots \cdot Q_m^{d_m}$ mod n; and determining that the message M is authentic if the response D has a value such that: h(M, $D^v \cdot G_1^{\epsilon_1 d_1} \cdot G_2^{\epsilon_2 d_2} \cdot \ldots \cdot G_m^{\epsilon_m d_m}$ mod n) is equal to the token T, wherein, for i=1, ..., m, $\epsilon_i$=+1 in the case $G_i \cdot Q_i^v$=1 mod n and $\epsilon_i$=−1 in the case $G_i = Q_i^v$ mod n.

16. The memory according to claim 15, wherein the challenges are such that $0 \leq d_i \leq 2^k - 1$ for i=1, ..., m.

17. A memory storing instructions which when executed cause a processor to execute the following method: obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v = 2^k$, and wherein k is a security parameter having an integer value greater than 1, and wherein each public value $G_i$ for i=1, ..., m is such that $G_i \equiv g_i^2$ mod n, wherein $g_i$ for i=1, ..., m is a base number having an integer value greater than 1 and smaller than each of the prime factors $p_1, \ldots, p_f$, and $g_i$ is a non-quadratic residue of the ring of integers modulo n;

receiving a token T from a demonstrator, the token T having a value such that T=h(M, R), wherein h is a hash function, M is a message received from the demonstrator, and R is a commitment having a value computed out of commitment components $R_j$ by using the Chinese remainder method, the commitment components $R_j$ having a value such that: $R_j = r_j^v$ mod $p_j$ for j=1, ..., F, wherein $r_1, \ldots, r_f$ is a series of integers randomly chosen by the demonstrator;

choosing m challenges $d_1, d_2, \ldots, d_m$ randomly;

sending the challenges $d_1, d_2, \ldots, d_m$ to the demonstrator;

receiving a response D from the demonstrator, the response D being computed from a series of response components $D_j$ using the Chinese remainder method, the response components $D_j$ having a value such that: $D_j = r_j \cdot Q_{1,j}^{d_1} \cdot Q_{2,j}^{d_2} \cdot \ldots \cdot Q_{m,j}^{d_m}$ mod $p_j$ for j=1, ..., F, wherein $Q_{i,j} = Q_i$ mod $p_j$ for i=1, ..., m and j=1, ..., f; and determining that the message M is authentic if the response D has a value such that: h(M, $D^v \cdot G_1^{\epsilon_1 d_1} \cdot G_2^{\epsilon_2 d_2} \cdot \ldots \cdot G_m^{\epsilon_m d_m}$ mod n) is equal to the token T, wherein, for i=1, ..., m, $\epsilon_i$=+1 in the case $G_i \cdot Q_i^v$=1 mod n and $\epsilon_i$=−1 in the case $G_i = Q_i^v$ mod n.

18. The memory according to claim 17, wherein the challenges are such that $0 \leq d_i \leq 2^k - 1$ for i=1, ..., m.

19. A memory storing instructions which when executed cause a processor to execute the following method:

obtaining a set of one or more private values $Q_1, Q_2, \ldots, Q_m$ and respective public values $G_1, G_2, \ldots, G_m$, each pair of values $Q_i$, $G_i$ verifying either the equation $G_i \cdot Q_i^v \equiv 1$ mod n or the equation $G_i \equiv Q_i^v$ mod n, wherein m is an integer greater than or equal to 1, i is an integer between 1 and m, and wherein n is a public integer equal to the product of f private prime factors designated by $p_1, \ldots, p_f$, at least two of these prime factors being different from each other, wherein f is an integer greater than 1, and wherein v is a public exponent such that $v = 2^k$, and wherein k is a security parameter having an integer value greater than 1, and wherein each public value $G_i$ for i=1, ..., m is such that $G_i \equiv g_i^2$ mod n, wherein $g_i$ for i=1, ..., m is a base number having an integr value greater than 1 and smaller than each of the prime factors $p_i, \ldots, p_f$, and $g_i$ is a non-quadratic residue of the ring of integers modulo n;

recording a message M to be signed;

choosing m integers $r_i$ randomly, wherein i is an integer between 1 and m;

computing commitments $R_i$ having a value such that: $R^i = r_i^v$ mod n for i=1, ..., m;

computing a token T having a value such that T=h(M, $R_1, R_2, \ldots, R_m$), wherein h is a hash function producing a binary train consisting of m bits;

identifying the bits $d_1, d_2, \ldots, d_m$ of the token T;

computing responses $D_i = r_i \cdot Q_i^{d_i}$ mod n for i=1, ..., m; and performing at least one of transmitting the token T and the response Di to at least one verifying entity, or storing the token T and the response Di on a database accessible to the public or to at least one verifying entity.

20. The memory according to claim 19, the method further comprising:

collecting the token T and the responses $D_i$ for i=1, ..., m; and determining that the message M is authentic if the responses $D_i$ have a value such that: h(M, $D_i^v \cdot G_1^{\epsilon_1 d_1}$ mod n, $D_2^v \cdot G_2^{\epsilon_2 d_2}$ mod n, ..., $D_m^v \cdot G_m^{\epsilon_m d_m}$ mod n) is equal to the token T, wherein, for i=1, ... m, $\epsilon_i$=+1 in the case $G_i \cdot Q_i^v$=1 mod n and $\epsilon_i$=−1 in the case $G_i = G_i^v$ mod n.

* * * * *

UNITED STATES PATENT AND TRADEMARK OFFICE
CERTIFICATE OF CORRECTION

PATENT NO. : 7,386,122 B1
APPLICATION NO. : 09/889918
DATED : June 10, 2008
INVENTOR(S) : Louis Guillou et al.

It is certified that error appears in the above-identified patent and that said Letters Patent is hereby corrected as shown below:

Column 7
Line 54 delete "$r_i\, Q_{i,1}^{d1}$" and insert -- $r_i \cdot Q_{i1}^{d1}$ --.

Column 16
Line 46 delete "$D^v G_1^{d1}$" and insert -- $D^v / G_1^{d1}$ --.

Column 24
Line 1 delete "mode" and insert -- mod --.
Line 10 delete "mode" and insert -- mod --.
Line 11 delete "mode" and insert -- mod --.

Column 27
Line 15 delete "$d - d_1$" and insert -- $d = d_1$ --.

Column 28
Line 58 delete " $G_i^{d'}i$ " and insert -- $G_i^{di}$ --.

Column 30
Line 43 delete " $G_1^{\delta\delta_1 d_1}$ " and insert -- $G_1^{\varepsilon_1 d_1}$ --.

Column 31
Line 10 delete "$Q_{1hu\ d}{}^1$" and insert -- $Q_1^{d_1}$ --.

Line 11 delete " $Qm^{d_m}$ " and insert -- $Q_m^{d_m}$ --.

Line 40 delete "Mis" and insert -- $M$ is --.
Line 53 delete "F," and insert -- $f$, --.

Line 56 delete " $G_1^{\varepsilon_1 d_1}$ " and insert -- $G_1^{\varepsilon_1 d_1} \cdot G_2^{\varepsilon_2 d_2}$ --.

UNITED STATES PATENT AND TRADEMARK OFFICE
CERTIFICATE OF CORRECTION

PATENT NO. : 7,386,122 B1
APPLICATION NO. : 09/889918
DATED : June 10, 2008
INVENTOR(S) : Louis Guillou et al.

It is certified that error appears in the above-identified patent and that said Letters Patent is hereby corrected as shown below:

Column 31 (Continued)
Line 61 delete "$0 \leqq d_i \leqq 2^k$" and insert -- $0 \leq d_i \leq 2^k$ --.
Line 64 delete "on eor" and insert -- one or --.

Signed and Sealed this

Twenty-third Day of September, 2008

JON W. DUDAS
*Director of the United States Patent and Trademark Office*